US012789923B2

(12) United States Patent
Morgan et al.

(10) Patent No.: US 12,789,923 B2
(45) Date of Patent: Nov. 10, 2026

(54) AERODYNAMIC SYSTEM FOR TRAILER WITH SLIDING CONNECTION

(71) Applicant: Trailer Aerodynamics LLC, Chicago, IL (US)

(72) Inventors: Justin Kane Morgan, Anderson, SC (US); Parker Baxter, Greenville, SC (US); John Spooner, Muskegon, MI (US)

(73) Assignee: Trailer Aerodynamics LLC, Chicago, IL (US)

( * ) Notice: Subject to any disclaimer, the term of this patent is extended or adjusted under 35 U.S.C. 154(b) by 197 days.

(21) Appl. No.: 18/843,342

(22) PCT Filed: Feb. 24, 2023

(86) PCT No.: PCT/US2023/063230
§ 371 (c)(1),
(2) Date: Sep. 3, 2024

(87) PCT Pub. No.: WO2023/168189
PCT Pub. Date: Sep. 7, 2023

(65) Prior Publication Data

US 2025/0196946 A1 Jun. 19, 2025

Related U.S. Application Data

(60) Provisional application No. 63/316,013, filed on Mar. 3, 2022.

(51) Int. Cl.
*B62D 35/00* (2006.01)

(52) U.S. Cl.
CPC .................................. *B62D 35/001* (2013.01)

(58) Field of Classification Search
CPC .................................................... B62D 35/001
USPC ...................................................... 296/180.4
See application file for complete search history.

(56) References Cited

U.S. PATENT DOCUMENTS 4,291,911 A 9/1981 Gallmeyer
4,611,847 A 9/1986 Sullivan
4,746,160 A * 5/1988 Wiesemeyer ........ B62D 35/001 296/180.2

(Continued)

FOREIGN PATENT DOCUMENTS

JP 2003011855 A 1/2003
JP 2013237423 A 11/2013

OTHER PUBLICATIONS

International Search Report and Written Opinion for PCT/US2023/063230; issued Jun. 26, 2023; 12 pages.

(Continued)

*Primary Examiner* — Amy R Weisberg
*Assistant Examiner* — Denise Lynne Esquivel
(74) *Attorney, Agent, or Firm* — Hansen Reynolds LLC

(57) ABSTRACT

An apparatus is provided that has a skirt that has an inner surface. A bending member is present that engages the skirt and is located inboard from the skirt in a lateral direction. The bending member has a vertical length that extends in a vertical direction. A connection is present between the skirt and the bending member that is a sliding connection. The connection has a slot and a fastener that is disposed through the slot. Relative movement between the skirt and the bending member causes the fastener to slide along the slot.

20 Claims, 17 Drawing Sheets

(56) References Cited

U.S. PATENT DOCUMENTS

| | | | | |
|---|---|---|---|---|
| 4,749,538 | A | 6/1988 | Anderson | |
| 5,004,293 | A | 4/1991 | Thomas | |
| 5,267,523 | A | 12/1993 | Hugron | |
| 5,277,146 | A | 1/1994 | Hughes, Jr. | |
| 6,048,018 | A * | 4/2000 | Shambeau | B62D 33/03 296/57.1 |
| 7,093,889 | B2 | 8/2006 | Graham | |
| 7,347,019 | B1 | 3/2008 | Shaw | |
| 7,578,541 | B2 | 8/2009 | Layfield et al. | |
| 7,686,385 | B2 | 3/2010 | Dolan et al. | |
| 7,748,772 | B2 | 7/2010 | Boivin et al. | |
| 7,942,467 | B2 | 5/2011 | Boivin et al. | |
| 8,191,956 | B1 * | 6/2012 | Dixon, Jr. | B62D 35/02 296/180.1 |
| 8,303,025 | B2 | 11/2012 | Senatro | |
| 8,608,122 | B2 * | 12/2013 | Mancina | F16B 2/12 248/228.2 |
| 8,678,474 | B1 | 3/2014 | Boivin et al. | |
| 8,727,425 | B1 | 5/2014 | Senatro | |
| 8,919,863 | B2 | 12/2014 | Layfield et al. | |
| 9,004,575 | B2 | 4/2015 | Grandominico et al. | |
| 9,199,676 | B2 | 12/2015 | Brown et al. | |
| 9,272,741 | B2 | 3/2016 | Gerst | |
| 9,409,610 | B2 | 8/2016 | Baker et al. | |
| 9,688,320 | B2 | 6/2017 | Courtney et al. | |
| 9,751,573 | B2 | 9/2017 | Senatro | |
| 10,414,448 | B2 * | 9/2019 | Boivin | B62D 35/001 |
| 10,577,033 | B2 | 3/2020 | Macherel et al. | |
| 10,696,335 | B2 | 6/2020 | Macherel et al. | |
| 12,459,582 | B2 | 11/2025 | Bradley | |
| 12,576,924 | B2 | 3/2026 | Bradley | |
| 2003/0057736 | A1 | 3/2003 | Long et al. | |
| 2009/0189414 | A1 | 7/2009 | Boivin et al. | |
| 2010/0264690 | A1 | 10/2010 | Brown et al. | |
| 2011/0175396 | A1 | 7/2011 | Boivin et al. | |
| 2011/0253851 | A1 | 10/2011 | Di Franco | |
| 2011/0285167 | A1 | 11/2011 | Butler | |
| 2012/0211617 | A1 | 8/2012 | Mancina et al. | |
| 2013/0270857 | A1 | 10/2013 | Brown et al. | |
| 2014/0028050 | A1 | 1/2014 | Rodriguez | |
| 2014/0265439 | A1 * | 9/2014 | White | B62D 35/001 296/180.4 |
| 2014/0270940 | A1 | 9/2014 | Butler et al. | |
| 2014/0353443 | A1 | 12/2014 | Kuo | |
| 2017/0015369 | A1 | 1/2017 | Senatro | |
| 2017/0029044 | A1 | 2/2017 | Senatro | |
| 2017/0066487 | A1 | 3/2017 | Boivin et al. | |
| 2017/0274942 | A1 | 9/2017 | Boivin et al. | |
| 2018/0093719 | A1 | 4/2018 | Emery et al. | |
| 2020/0039587 | A1 | 2/2020 | Bradley | |
| 2022/0126931 | A1 | 4/2022 | Boivin et al. | |
| 2023/0415834 | A1 | 12/2023 | Bradley | |
| 2025/0171092 | A1 | 5/2025 | Morgan et al. | |
| 2025/0178676 | A1 | 6/2025 | Baxter et al. | |
| 2025/0196946 | A1 | 6/2025 | Morgan et al. | |
| 2025/0346306 | A1 | 11/2025 | Kron et al. | |
| 2025/0346308 | A1 | 11/2025 | Boivin et al. | |

OTHER PUBLICATIONS

International Search Report and Written Opinion for PCT-US2015-065236 dated Jun. 10, 2016; 10 pages.
International Search Report and Written Opinion for PCT-US2016-054947 dated Jan. 19, 2017; 10 pages.
International Search Report and Written Opinion for PCT/US2015/065238 dated Jun. 16, 2016; 9 pages.
International Search Report and Written Opinion for PCT/US2016/054941 dated Jan. 19, 2017; 11 pages.
International Search Report and Written Opinion for PCT/US2016/054951 dated Jan. 19, 2017; 10 pages.
International Search Report and Written Opinion for PCT-US2015-065234 dated Jun. 9, 2016; 10 pages.
International Search Report and Written Opinion for PCT-US2023/063223 dated Jun. 16, 2023; 12 pages.
International Search Report and Written Opinion for PCT-US2023/063270 dated Jun. 22, 2023; 11 pages.

* cited by examiner

AERODYNAMIC SYSTEM FOR TRAILER WITH SLIDING CONNECTION

CROSS-REFERENCE TO RELATED APPLICATION

This application is a national phase entry under 35 U.S.C. § 371 of International Application No. PCT/US2023/063230, filed on Feb. 24, 2023, which claims priority to U.S. Provisional Patent Application No. 63/316,013, filed on Mar. 3, 2022. The contents of the above-referenced PCT application and the above-referenced United States Provisional Application are incorporated by reference herein in their entirety for all purposes.

FIELD OF THE INVENTION

The subject matter of the present invention relates to an apparatus that has a skirt and bending member for increasing aerodynamic performance of a trailer. More particularly, the present application involves a bending member and skirt combination that features a sliding connection to absorb stress when the skirt and bending member are deflected from their normally at rest position.

BACKGROUND OF THE INVENTION

Trailers towed by trucks and similar vehicles for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. Trailer skirts should be rigid enough to not deform in their normal operating condition to appropriately deflect air and prevent drag on the moving trailer, however the skirt needs to exhibit some degree of flexibility because it is close to the ground and can hit curbs, snow, road debris, or other objects thus necessitating movement of the skirt to prevent the skirt from being detached or damaged.

It is known to provide support members attached to the trailer that engage and support the skirt. These support members themselves can flex to accommodate flexing of the skirt when the skirt strikes an object. Once the deflection force is removed the skirt and support member may spring back to their normal, at-rest positions. In the normal, at rest position the support member may have a face, the majority of which is parallel to the complimentary facing skirt face. This type of support member is a resilient vertical bifurcating beam and can be seen in U.S. Pat. No. 10,696,335 entitled Methods and Apparatus for Pivotally Mounting Trailer Skirt, owned by the Applicant of the present application, the contents of which are incorporated by reference herein in their entirety for all purposes. This configuration includes the addition of a sliding bracket to the skirt, and the bending member slides completely through this bending bracket during deflection events.

The support member can be configured to push the skirt back into the normal, at rest position when the skirt is deflected outboard, and when the skirt is deflected inboard. However, support members are bolted at their bottom ends to the skirt. During deflection events, the fasteners at the bottom of the support member that attach to the skirt often cause damage to the skirt or to the support member. This connection is a rigid connection and causes stress in the system when the components bend and deflect. On the other hand, if the skirt is not mounted securely enough to the trailer, it will flutter during travel of the trailer which is also undesirable because this condition will eventually damage the skirt and will reduce aerodynamic performance. Although designs that incorporate additional hardware and components into the aerodynamic system are utilized to alleviate these stated concerns, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
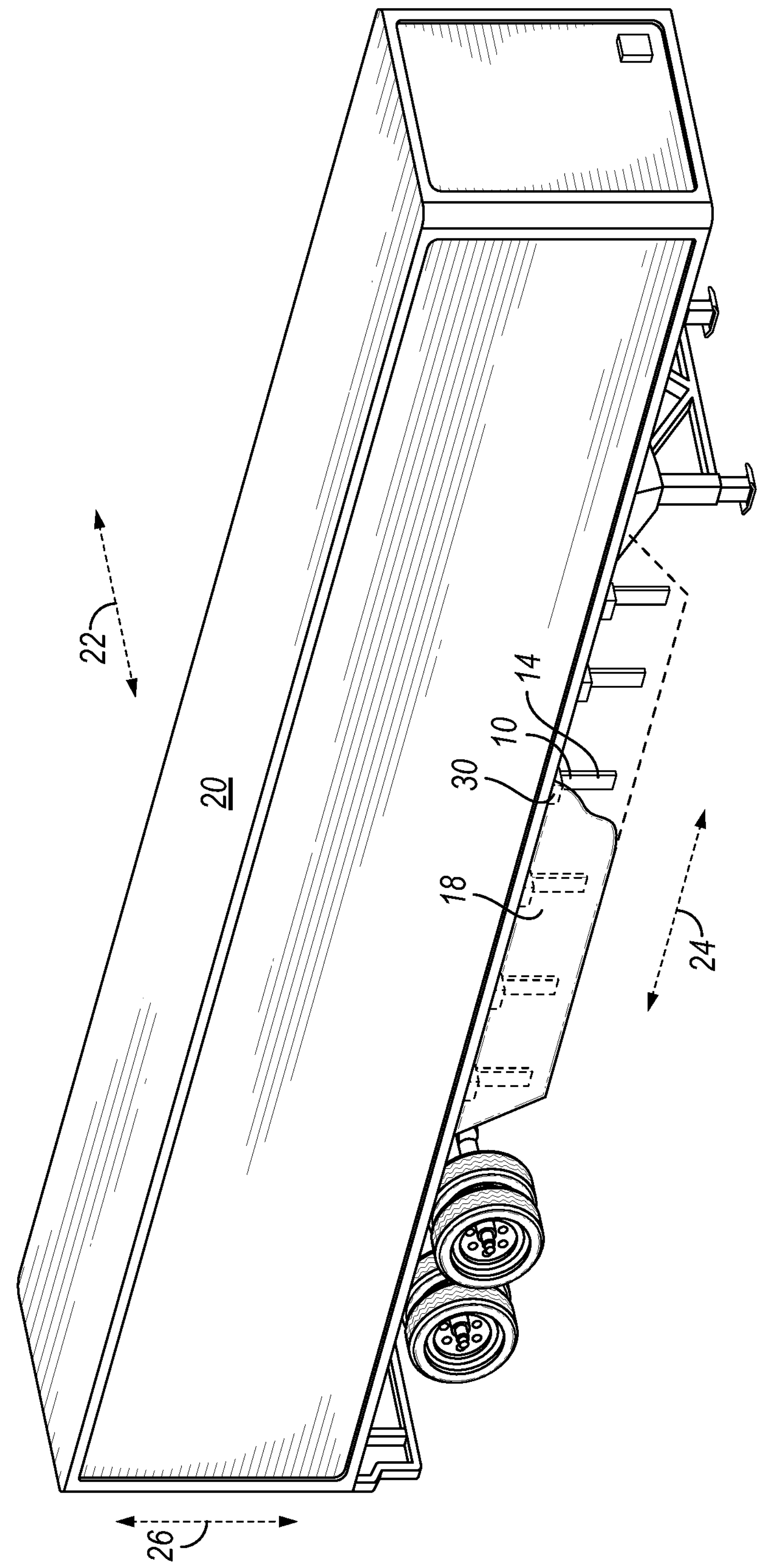
FIG. 1 is a perspective view of an aerodynamic trailer system attached to a trailer with a portion of the skirt shown in hidden lines for clarity.

Reference will now be made in detail to embodiments of the invention, one or more examples of which are illustrated in the drawings. Each example is provided by way of explanation of the invention and is not meant as a limitation of the invention. For example, features illustrated or described as part of one embodiment can be used with another embodiment to yield still a third embodiment. It is intended that the present invention include these and other modifications and variations.

An apparatus 10 fitted onto a trailer 20 is illustrated with reference to FIG. 1 in which the skirt 18 is located under the trailer 20 and prevents air from hitting the rear wheels of the trailer 20 during travel of the trailer 20. The skirt 18 extends in a longitudinal direction 24 and may be oriented at an angle to the trailer 20 or in some instances may extend in the same direction as the length of trailer 20. The skirt 18 can have any length in the longitudinal direction 24 but generally extends from the rear wheels to the vertical support of the trailer 20. A second skirt (not shown) can be located on the opposite side of the trailer 20 to prevent or direct air flow related to the opposite side. Any number of bending members 14 may be used to support the skirt 18. Brackets can be attached to the top of the skirt 18 and the bottom surface or I-beams 28, referred to also as ribs 28, of the trailer 20 to in turn attach the skirt 18 to the trailer 20. The opposite skirt (not shown) may likewise have any number of bending members 14 integrated therewith for its support. The skirt 18 can be held to the trailer 20 via only the bending members 14, or can be held onto the trailer 20 via the bending members 14 and additional brackets. Still further, in other embodiments the skirt 18 can be held onto the trailer 20 solely by the brackets, and the bending members 14 can be present not to hold the skirt 18 onto the trailer 20 but to instead support the skirt 18 upon deflection and act to push it back into its normal, at-rest position.

The height of the skirt 18 in the vertical direction 26 may be selected so that it is large enough to cover the necessary area of air deflection that is desired, yet small enough so that it is not scraping the ground or otherwise easily hitting the road surface or objects resting on the road surface. It is presumed, however, that in the normal course of driving the skirt 18 will strike objects when the trailer 20 navigates curves, goes over objects, reaches a crown in the road, hits a snowbank, or otherwise engages anything found on roads or in distribution centers.

Figure 2:
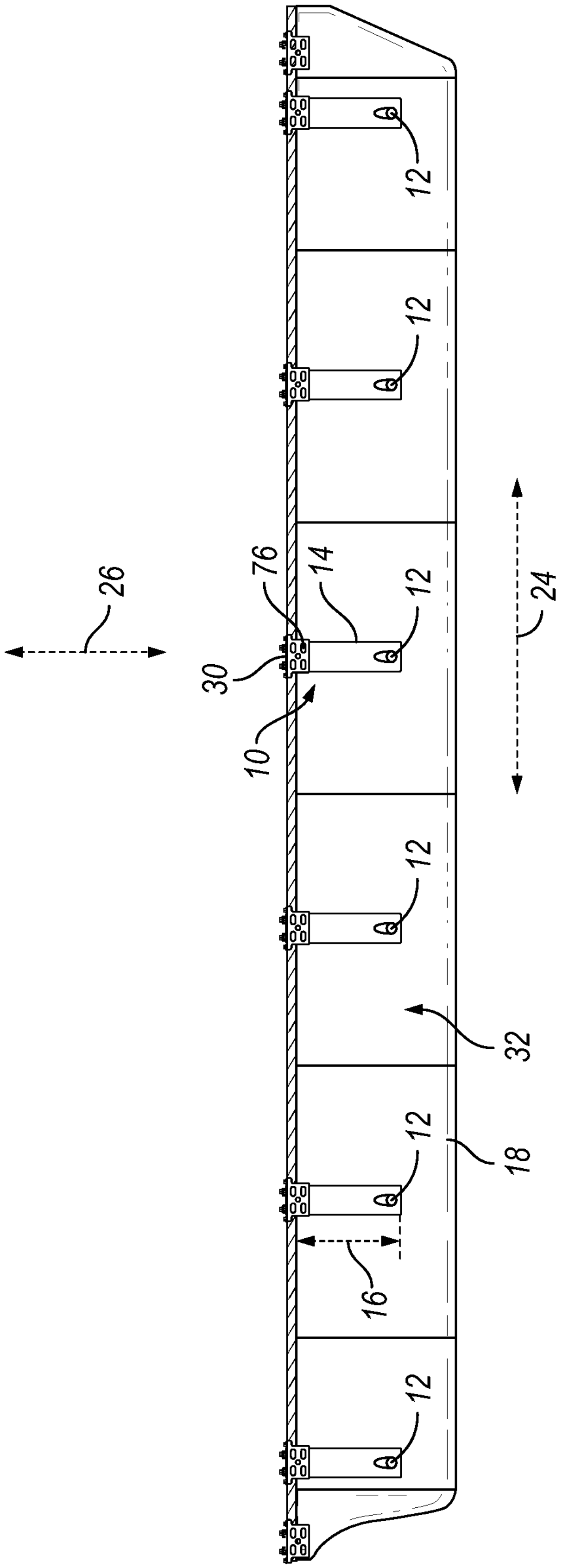
FIG. 2 is a side elevation view of the apparatus including the skirt and bending member.

A back side view of the skirt 18 with the attached bending members 14 of the apparatus 10 is illustrated with reference to FIG. 2. An attachment device 30 is attached to the trailer 20, for example through bolting, and the bending member 14 is attached to the attachment device 30 and extends in the vertical direction 26. The bending members 14 and attachment devices 30 are located at the top of the skirt 18 in the vertical direction 26 and are generally spaced evenly from one another in the longitudinal direction 24. The bending members 14 extend from the top of the skirt 18 downward in the vertical direction 26 but do not extend the entire length of the height of the skirt 18. Instead, the bending members 14 stop short of the bottom of the skirt 18. The skirt 18 may be a single piece member made up of one component or can be multiple components that are attached to one another. In the embodiment in FIG. 2, the skirt 18 is made from a plurality of central panels that are attached to one another to form almost the entire length. A rear trailer skirt panel forms the back end of the skirt 18 and is attached to the tailing central panel. The rear trailer skirt panel has a shape and size different than the central panel to which it is attached. A front trailer skirt panel is located at the front of the skirt 18 and is attached to and shaped and sized differently than the leading central panel.

The bending members 14 may be configured in a variety of manners in accordance with different exemplary embodiments so that they allow for bending of the skirt 18 to take place when the skirt 18 engages an object. The bending member 14 may be elongate, and can be attached to the skirt 18 using any desired mechanism, such as by use of one or more fasteners, weldments, adhesives, clamps, and/or mounting brackets as previously stated. As shown, bolts 76 attached the top of the bending member 14 to the top of the skirt 18, and this attachment with bolts 76 may be a rigid connection. The skirt 18 can be attached to the trailer 20 through brackets, through the bending member 14, or through a combination of brackets and the bending members 14.

The apparatus 10 enables the skirt 18 to snap back into the default position once the obstacle interaction is complete by means of the bending member 14 arranged vertically 26 along the inner surface 32 of the skirt 18. The number of bending members 14 needed depends on the skirt 18 variant being used. The bending members 14 are attached to the skirt 18 and mounted onto the cross I-beams 28 under the trailer 20. These I-beams 28 are also called "ribs" of the trailer 20. The bending member 14 features a shape and design that provides varying stiffness along the length of its body. The toggle location of the bending member 14 as the skirt 18 complies to the obstacle has been designed to provide the required force to bring the skirt 20 back into position. The bending member 14 can spring back to its normal, at rest, position such that if the skirt 18 is deflected inboard in the lateral direction 22 it can spring back, and such that if the skirt 18 is deflected outboard in the lateral direction 22 it can again spring back once the force of deflection is removed.

Figure 3:
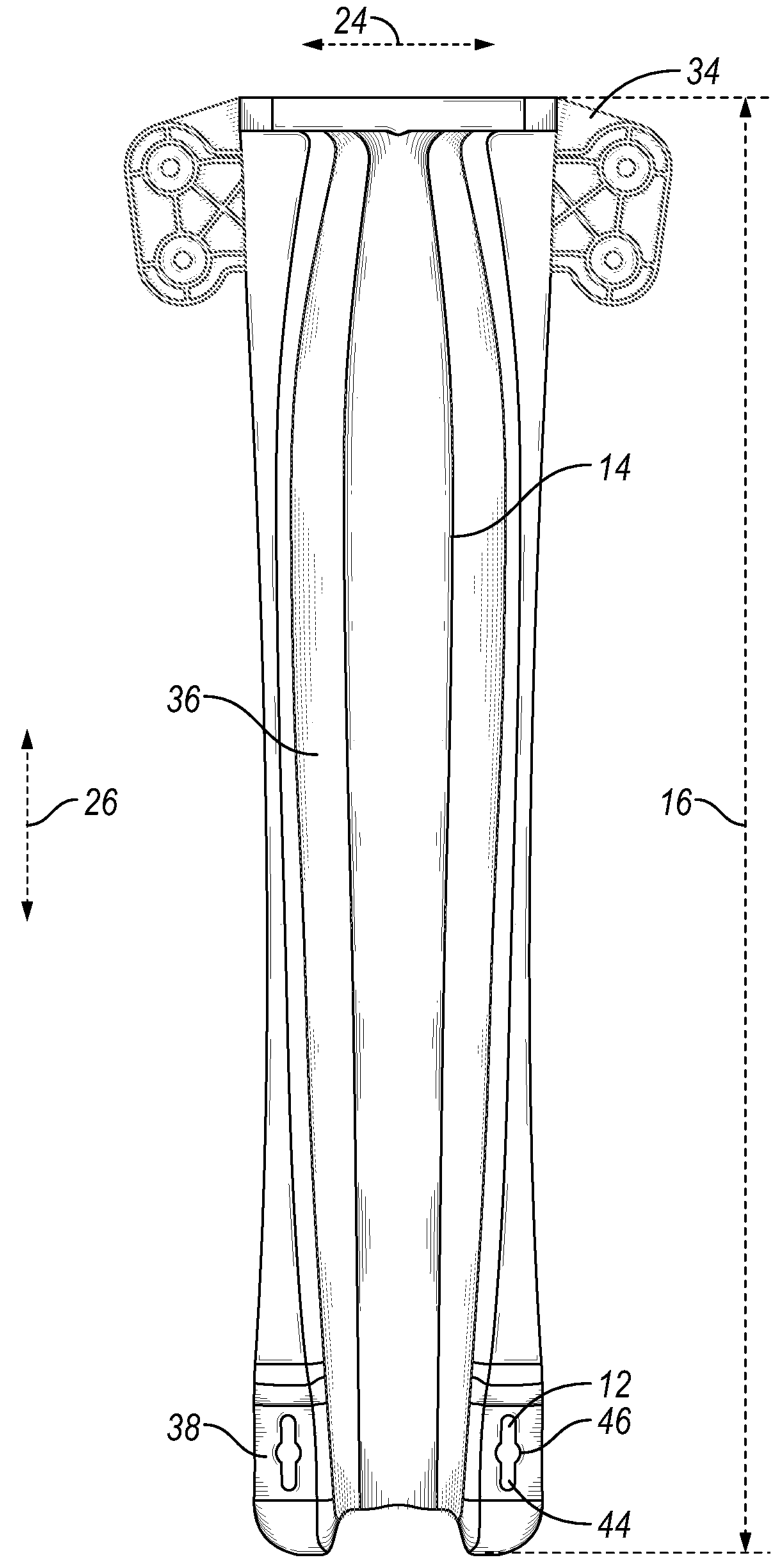
FIG. 3 is a right side view of a bending member in accordance with one exemplary embodiment.

A bending member 14 is shown in FIG. 3 and is organized into a top portion 34, middle portion 36, and bottom portion 38 in the vertical direction 26. The middle portion 36 may be longer in the vertical direction 26 than the lengths of the top and bottom portions 34, 38 combined. The middle portion 36 may make up at least 75% of the vertical length 16, the top portion may make up 20% or less of the vertical length 16, and the bottom portion 38 may make up 20% or less of the vertical length 16. The top portion 34 may not bend or flex during deflection of the skirt 18, and provides the bending member 14 with an attachment location to the skirt 18 and to the I-beam 28. The middle portion 36 may function as a bending beam to support the skirt 18 to prevent fluttering, and to push the skirt 18 back into its normal, at rest position after deflection of the skirt 18 upon hitting an obstacle. The bottom portion 38 in this arrangement provides a connection 12 with the skirt 18 that is a stress absorbing connection in that it is not a rigid connection between the bottom portion 38 and the skirt 18. In this regard, the bending member 14 and the skirt 18 may not deflect exactly the same as one another upon the skirt 18 hitting an obstacle, thus avoiding stress at a rigid connection at the bottom portion 38 that would damage the skirt 18 and/or bending member 18. The connection 12 is designed to absorb this stress that could result between different bending reactions of the skirt 18 and bending member 14 so that damage does not occur.

Figure 4:
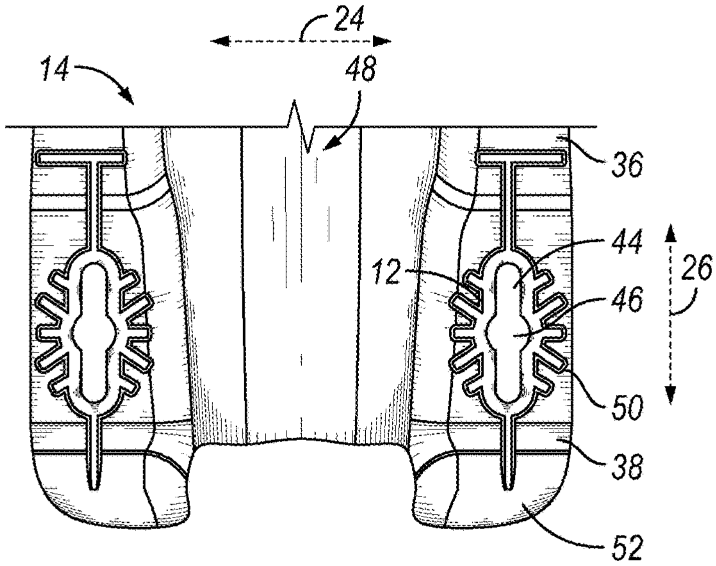
FIG. 4 is a left side view of a bottom portion of the bending member of FIG. 3.

The connection 12 can be configured in a variety of manners, and as shown in FIG. 3 includes a slot 44 in the bottom portion 38 that extends completely in the vertical direction 26. There are two slots 44 near opposite ends of the bending member 14 in the longitudinal direction 24, and the connections 12 can be configured in the same manner so a repeat of this information is not necessary. The slot 44 is spaced in the vertical direction 26 from the bottom terminal end of the bending member 14 and is spaced from the terminal ends in the longitudinal direction 24. The slot 44 extends longer in the vertical direction 26 than it extends in the longitudinal direction 24. FIG. 4 is a view from the opposite side in the lateral direction 22 from the view shown in FIG. 3 and is a close up of the bottom portion 38. The slot 44 extends completely through the material of the bending member 14 in the lateral direction 22 such that it is a through aperture. In order to strengthen and reinforce this portion of the bending member 14 that features the slot 44, strength members 50 are present that are extra portions of material of the bending member 14 that strengthen the bending member 14 in the bottom portion 38, and specifically add strength due to the presence of the slot 44. Although shown only on the outboard side 48, the strength members 50 could be located on the opposite side or on both lateral sides in other embodiments. The entire bending member 14 may be made of plastic. The bottom portion 38 shown FIGS. 3 and 4 can be made entirely of plastic.

Figure 5:
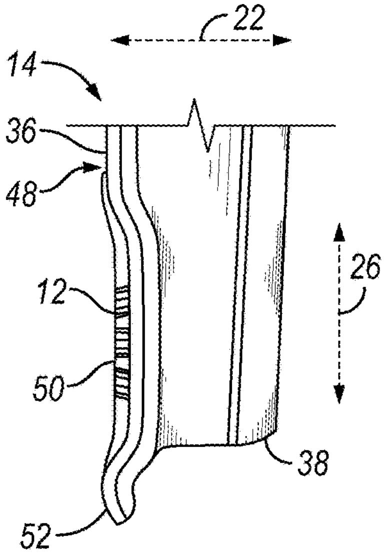
FIG. 5 is a front view of the bottom portion of the bending member of FIG. 3.

FIG. 5 shows the bending member 14 of FIG. 3 from the front and is a close up view of the bottom portion 38. The outboard side 48 of the bending member 14 is the side in the lateral direction 22 that faces outboard in the lateral direction 22 when assembled onto the trailer 20, and can directly face and contact the inner surface 32 of the skirt 18. The middle portion 36 may be identified in this embodiment as being the part of the bending member 14 that stops when the bending member 14 begins to curve inward in the lateral direction 22, thus demarcating the start of the bottom portion 38. The bottom portion 38 thus has two ears on opposite sides in the longitudinal direction 24 with the center curved portion therebetween. The ears of the bottom portion 38 extend inboard in the lateral direction 22 and then have the same position in the lateral direction 22 for a majority of the length of the bottom portion 38 in the vertical direction 26. The ears then extend outward in the lateral direction 22 and terminate in a toe 52 of the bending member 14 that is located at the bottom terminal end of the bending member 14 in the vertical direction 26. In the normal, at rest portion the majority of the length of the ears of the bottom portion 38 are out of engagement with the inner surface 32 of the skirt 18. The ears of the bending member 14 may flex in the lateral direction 22 upon deflection events, and may move into and out of engagement with the skirt 18. The toe 52 may likewise engage the skirt 18 during the normal, at rest position or may move into and out of engagement in various embodiments. The strength members 50, if present, may engage the inner surface 32 or could be out of engagement with the inner surface 32.

Figure 6:
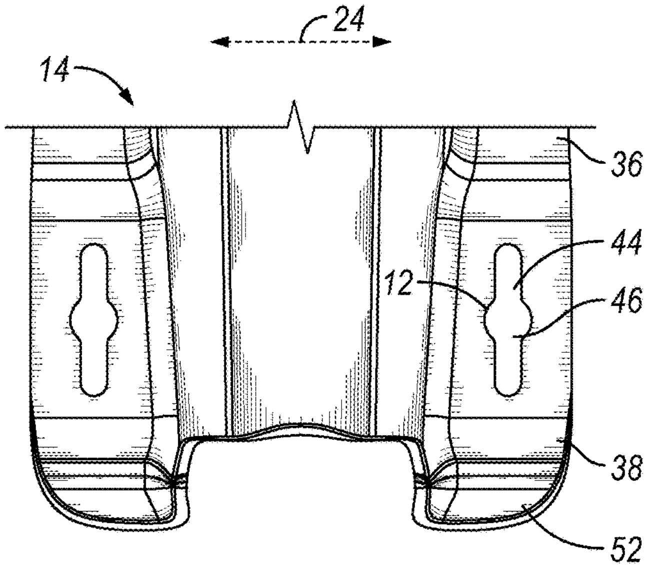
FIG. 6 is a right side view of the bottom portion of the bending member of FIG. 3.

FIG. 6 is a close up view of the bottom portion 38 of FIG. 3. The slots 44 are shown as being completely vertical in orientation, and have detents 46 in their center in the vertical direction 26. The detent 46 is a widening of the slot 44 such that the slot has a larger size in the longitudinal direction 24 at the detent 46 than above and below the detent 46 in the vertical direction 26. The detent 46 of the slot 44 likewise extends completely through the material of the bending member 14 in the lateral direction 22. In one exemplary embodiment, the detent 46 has a diameter of 9.65 millimeters, the vertical ends of the slot 44 each have a radius of 2.54 millimeters, and the distance in the vertical direction 26 from the axis of curvature of these two ends to one another is 25.4 millimeters.

The slot 44 can be variously dimensioned in other embodiments and need not include the detent 46. In some arrangements, the slot 44 can have a widest length in the longitudinal direction 24 that is from 5.08-6.35 millimeters, and that has a length at its most narrow point in the longitudinal direction 24 that is from 4.32-5.59 millimeters.

Figure 7:
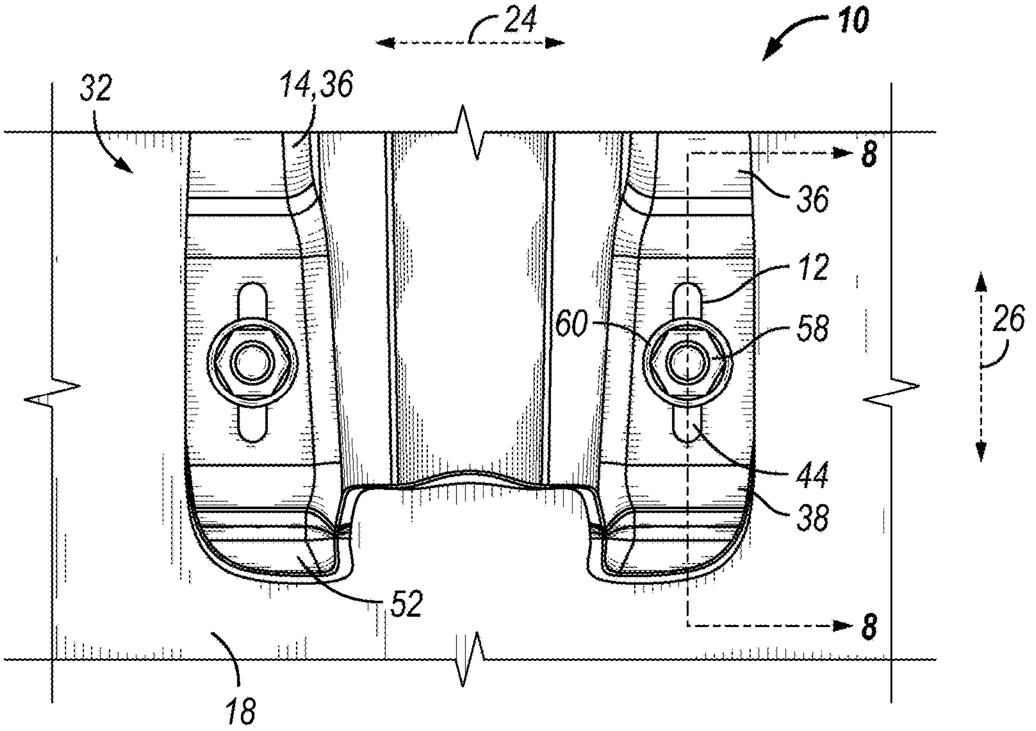
FIG. 7 is a right side view of an apparatus that includes the bending member of FIG. 3.
Figure 8:
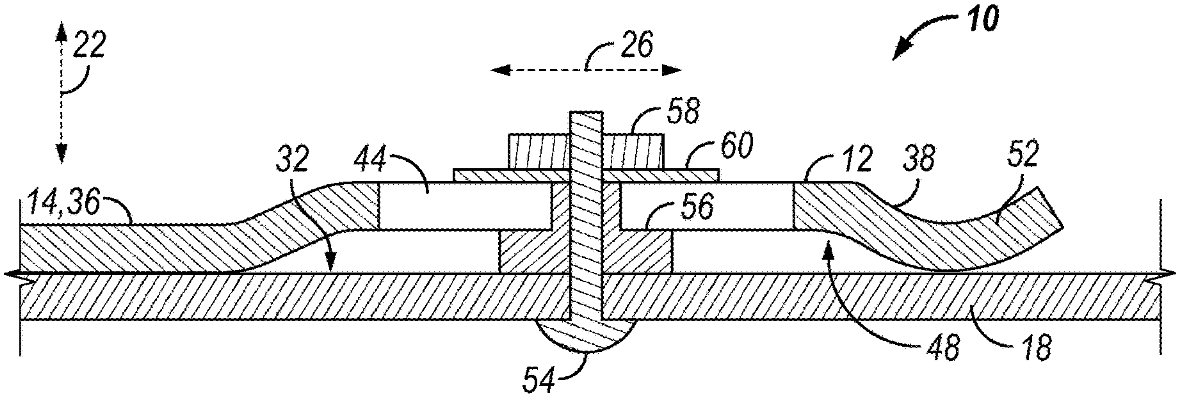
FIG. 8 is a cross-sectional view taken along line 8-8 of FIG. 7.
Figure 9:
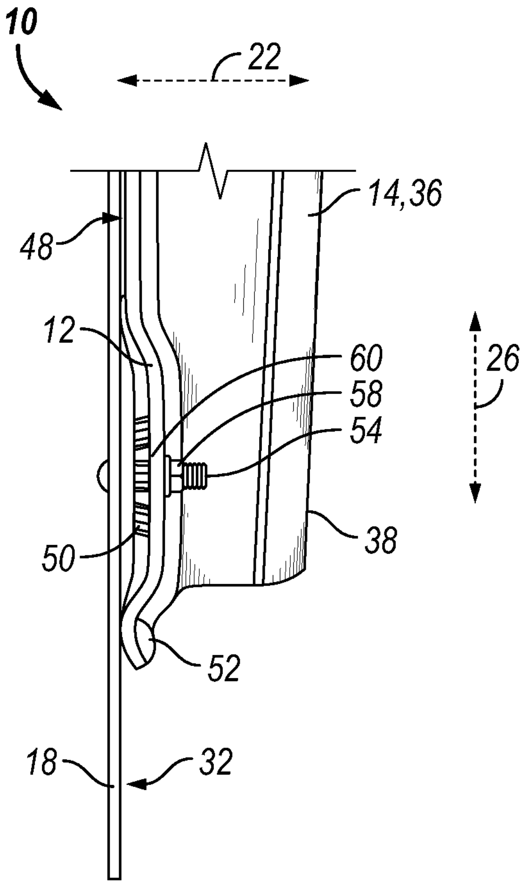
FIG. 9 is a front view of the apparatus of FIG. 7.

FIGS. 7-9 show the apparatus 10 that includes the bending member 14 of FIGS. 3-6. The skirt 18 includes a fastener 54 that extends through the skirt 18 and in the lateral direction 22. The fastener 54 may be rigidly attached to the skirt 18 such that the fastener does not move relative to the skirt 18. The fastener 54 may be the same material as the skirt 18, or could be a different material from the rest of the skirt 18. A bushing 56 is located on the fastener 54 and as shown engages the inner surface 32. The bushing 56 is made of a material that accommodates sliding in the connection 12, and may in some instances be compressible. The use of a bushing 56 may improve the function of the connection 12 and may extend the life of the connection 12 as it may avoid the use of materials that tear into one another and cause damage. A washer 60 is located on the fastener 54 and engages the bending member 14. The washer 60 may engage the bushing 56 as well in some arrangements. The washer 60 has a diameter big enough so that it engages the sides of the bending member 14 opposite to the slot 44 in the longitudinal direction 24. A nut 58 is also located on the fastener 54 and engages the washer 60 but not the bending member 14. When the nut 58 is tightened, the skirt 18 is drawn towards the bending member 14 in the lateral direction 22 to cause the connection 12 to be tightened to function to attach the skirt 18 to the bending member 14 at the bottom portion 38.

The skirt 18 and bending member 14 are shown in the normal, at rest position in FIGS. 7-9 and in this position the fastener 54 and bushing 56 are located in the detent 46 of the slot 44. When the skirt 18 and bending member 14 bend during deflection, and a sufficient difference between the way the skirt 18 bends from the way the bending member 14 bends is present, the bushing 56 and fastener 54 will pop out of the detent 56 and with the nut 58 and washer 60 travel upwards or downwards in the slot 44. This movement between the skirt 18 and bending member 14 afforded by the connection 12 absorbs stress in the apparatus 10 that would otherwise result should the connection 12 instead be a rigid connection between the skirt 18 and bending member 14. The detent 46 is sized so that a sufficient amount of force is necessary to pop the bushing 56 and fastener 54 out of it for movement along the slot 44. The detent 46 acts as a spring load which allows for compression and sliding of the joint during operation. The slot 44 is not open on its ends in the vertical direction 26 such that the slot 44 is not an open slot and encapsulates the fastener 54 to limit its movement in the vertical direction 26 relative to the bending member 14. The connection 12 can thus be said to allow for restrained relative motion between the skirt 18 and bending member 14. In this regard, the fastener 54 may slide along the slot 44 until it reaches the upper or lower end of the slot 44 at which time it will engage material of the bending member 14 and its travel stopped. The bending member 14 and skirt 18 will thus be locked to one another at this point and will bend as a single member without sliding relative movement between the bending member 14 and skirt 18. The connection 12 thus allows some relative motion between the bending member 14 and skirt 18 when enough force is applied to bend them, but this relative motion is limited and stopped once the connection 12 is moved to its maximum range thus causing the members 14, 18 to then bend as a single unit. Releasing the force of deflection will cause the connection 12 to spring back to the normal, at rest position shown in FIGS. 7-9 with the fastener 54 again disposed within the detent 46.

In some versions of the connection 12, the ears of the bottom portion 38 function as a leaf spring in that when the force of deflection is applied to the connection, these ears could move toward the inner surface 32. In this regard, the bushing 56 will compress and the toe 52 may flatten or otherwise move against or away from the inner surface 32 depending upon the deflection. The leaf spring can spring back once the force of deflection is removed, and provides the connection 12 with another way to absorb stress imparted onto the bending member 14 and skirt 18 during deflection. Although described as functioning as a leaf spring, the ears of the bottom portion 38 could be assembled with the connection 12 or otherwise made so that they do not function as a leaf spring in other embodiments. The connection 12 at the bottom of the bending member 14 allows the loads at this bottom joint to be dissipated more and reduces failure or damage during a relative motion event.

The connection 12 is tightened to such a degree that it provides a solid connection between the skirt 18 and bending member 14 to hold the skirt 18 to prevent fluttering during travel of the trailer 20. However, the connection 12 is not so tight that it prevents the fastener 54 from moving within the slot 44 during deflection events of the skirt 18 and bending member 14.

Figure 10:
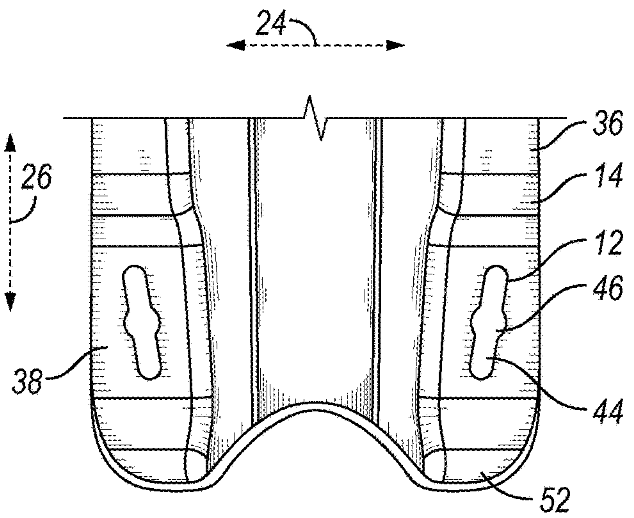
FIG. 10 is right side view of a bottom portion of a bending member that has angled slots.

Another embodiment of the connection 12 is shown in FIG. 10 in which the slot 44 and detent 46 are again present as previously discussed. However, in this embodiment, the slots 44 do not extend completely in the vertical direction 26, but are instead angled relative to the vertical direction 26 so that they have a component of extension in both the vertical direction 26 and in the longitudinal direction 24. Each one of the two slots 44 is arranged so that when moving downwards in the vertical direction 26, the slots 44 each extend some degree toward one another. In this regard, the slot 44 forward in the longitudinal direction 24 moves rearward in the longitudinal direction 24 upon movement downward in the vertical direction 26. The other slot 44 that is rearward in the longitudinal direction 24 moves forward in the longitudinal direction 24 upon movement downward in the vertical direction 26. The angled orientation of the slots 44 provides resistance to relative motion between the skirt 18 and bending member 14 and allows this bending dynamic to be fine-tuned. Also, since the slots 44 extend some length in the longitudinal direction 24, the connection 12 also affords movement between the skirt 18 and the bending member 14 in the longitudinal direction 24 during skirt 18 deflection. The angle of the slots 44 to the vertical direction 26 are not zero, and may be the same as one another although opposite in direction. In some embodiments, the angle may be 5 degrees to 30 degrees to the vertical direction 26, in which zero degrees would represent a slot that extends from terminal end to terminal end completely in the vertical direction 26. The angled orientation of the slots 44 allow for expansion/contraction of the skirt 18 and/or bending member 14 in the longitudinal direction 24 during inboard/outboard toggle of the components 18, 14.

Figure 11:
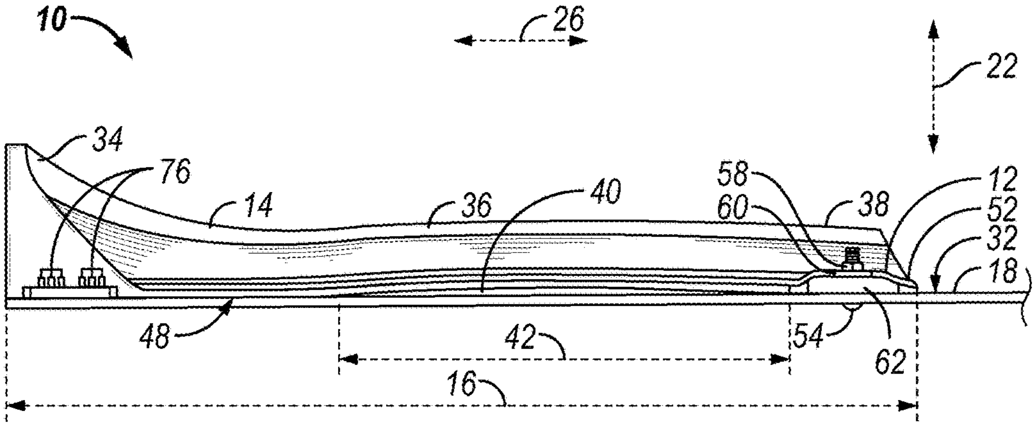
FIG. 11 is a front view of an apparatus in accordance with another exemplary embodiment.

FIG. 11 shows an apparatus 10 in accordance with another exemplary embodiment. The apparatus 10 has a skirt 18 that is attached to bending member 14 at its upper end via bolts 76. The connection 12 is configured differently than previous embodiments in that it includes an insert 62 that engages the inner surface 32. The insert 62 fills up some, but not all of, the space under the ears of the bottom portion 38 between the bending member 14 and the inner surface 32.

Figure 12:
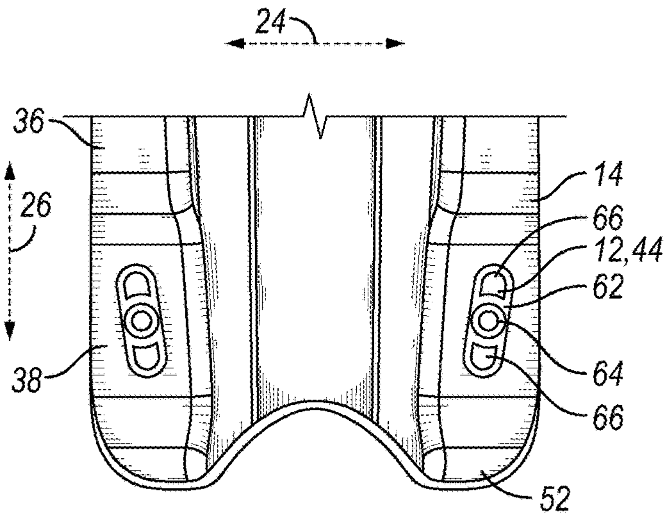
FIG. 12 is a right side view of a bottom portion of the bending member of FIG. 11.
Figure 13:
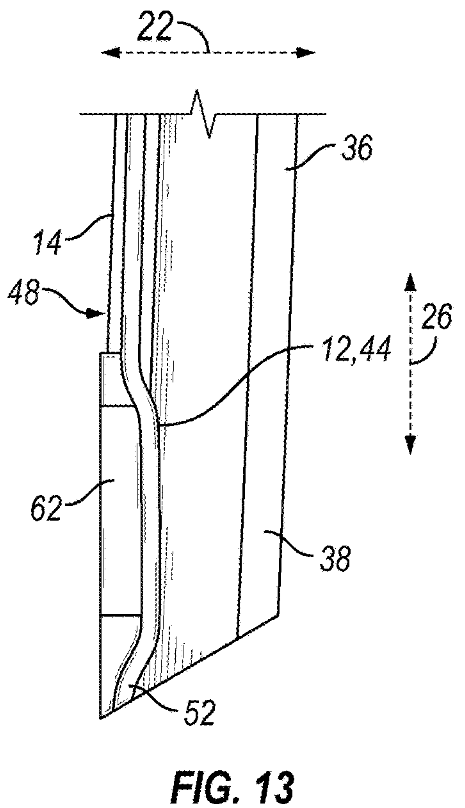
FIG. 13 is a front view of a bottom portion of the bending member of FIG. 11.
Figure 14:
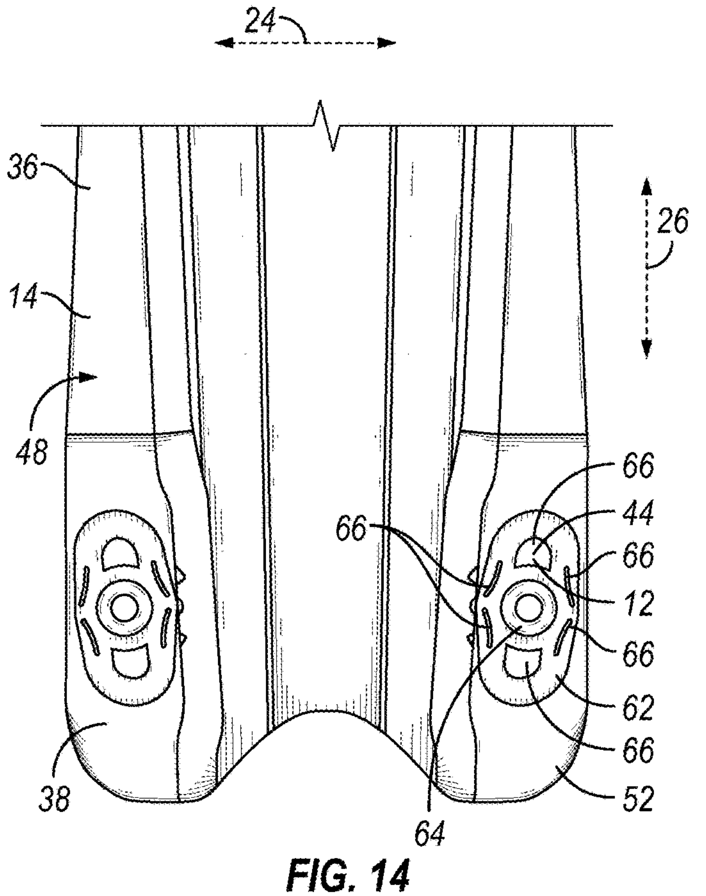
FIG. 14 is a left side view of a bottom portion of the bending member of FIG. 11.

FIGS. 12-14 illustrate the bending member 14 of FIG. 11 and focuses on the bottom portion 38. The connection 12 is angled relative to the vertical direction 26, and the slots 44 can be angled as previously discussed with respect to the discussion above concerning the FIG. 10 embodiment. An insert 62 is present in the slot 44 and extends in the lateral direction 22 so as to be located outboard of the outboard side 48. The insert 62 thus fills some, but not all of, the space created under the ears of the bottom portion 38. The insert 62 fills the slot 44, but does not extend on the opposite side beyond the top of the ears inboard in the lateral direction 22. In other embodiments, it may extend beyond the top of the ears. The insert 62 is made of a material that is softer than the surrounding material of the bending member 14, and this material of the insert 62 has a different modulus of elasticity than the surrounding bending member 14 material. In some instances, the bending member 14 is made of plastic, and the material of the insert 62 is softer plastic or rubber. Also included in the insert 62 is a harder component 64 that is cylindrical in shape with a through hole. This harder component 64 is within the softer material of the insert 62 and engages the fastener 54 which is received through the hole of the harder component 64. The harder component 64 is not as flexible as the other material of the insert 62, and may have a different modulus of elasticity than this other material. In some instances, the harder component 64 is the same material as the rest of the material making up the bending member 14, or may be a material that is harder and less flexible than the material making up the bending member 14. In some instances, the material making up the bending member 14 is plastic, the material making up the insert 62 is softer plastic, and the material making up the harder component 64 is metal. The harder component 64 is contained within the softer material of the insert 64. The insert 62 may be an elastomer.

The insert 64 includes a series of voids 66. With reference to FIGS. 12 and 14, two of the voids 66 extend completely through the insert 62 and are located vertically above and below the harder component 64. These voids have a generally semi-circular shape such that they follow a shape similar to the concave upper and lower ends of the slot 44. FIG. 14 shows four additional voids 66, two of which are forward of the harder component 64 in the longitudinal direction 24, and two of which are rearward of the harder component 64 in the longitudinal direction 24. These four voids 66 extend into the insert 62 from its outboard side, but do not extend all the way through the bending member 14 to the surface shown in FIG. 12. The six voids 66 in the insert 62 accommodate compression and movement from and of the harder component 64 and the fastener 54. In this regard, when force acts on the insert 62 to compress it, the material may move into and close off one or more of the voids 66 to accommodate this movement. Upon comparison of FIGS. 12 and 14, one may note that the insert 62 is longer in the longitudinal direction 24 at the outboard side 48, and not as long in the longitudinal direction 24 at the opposite side of the bending member 14 as shown in FIG. 12. The insert 62 is thus "T" shaped in cross section so that it does not have the same size in the longitudinal direction 24 upon extension in the lateral direction 22. The insert 62 can be made of resilient material and this material may aid in the absorption of natural frequency during operating conditions.

Figure 15:
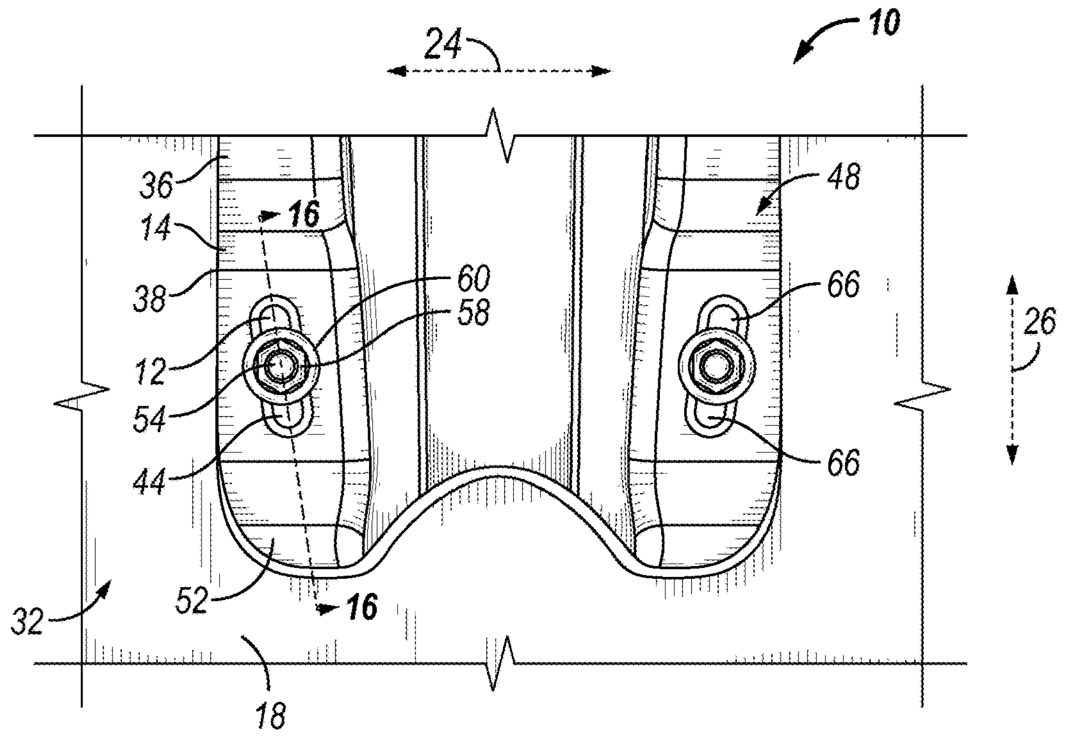
FIG. 15 is a right side view of the apparatus of FIG. 11 that shows the bottom portion of the bending member.
Figure 16:
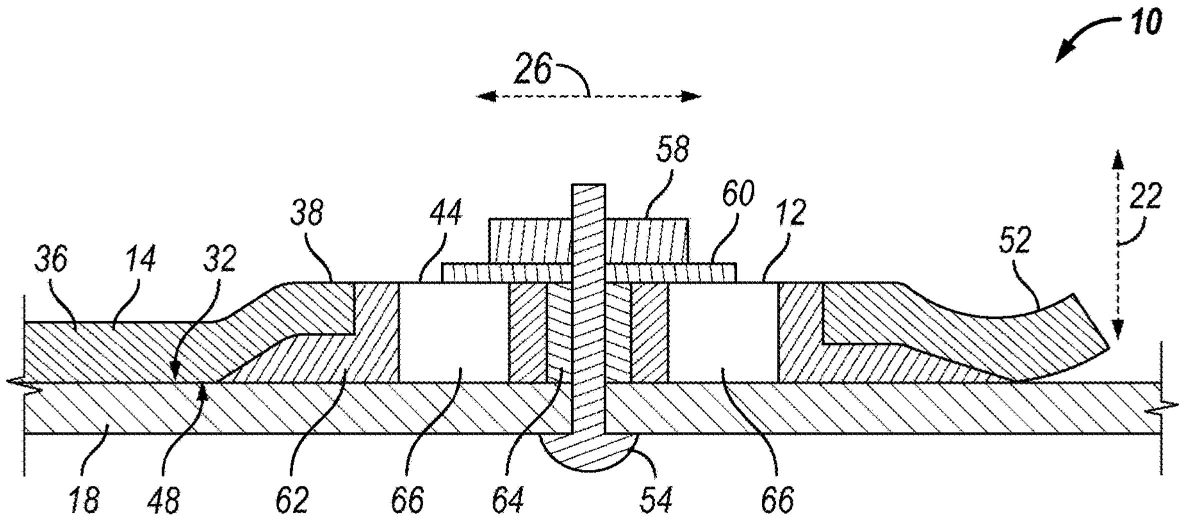
FIG. 16 is a cross-sectional view taken along line 16-16 of FIG. 15.

FIGS. 15 and 16 show the bending member of FIGS. 11-14 incorporated into the apparatus 10, and in particular a close up view of the bottom portion 38 and corresponding apparatus 10 components. The fastener 54 is securely held on the skirt 18 and may be permanently and rigidly attached. In other embodiments, the fastener 54 is not permanently attached to the skirt 18, but only attached thereto via connection by the bolt 58. A bushing 56 is not present in the connection 12. The harder component 64 and insert 62 engage the skirt 18. The fastener 54 extends through the harder component 64 and through the insert 62, but does not engage the insert 62 and only contacts the harder component 64. The fastener 54 likewise extends through the washer 60 and nut 58. Tightening of the nut 58 compresses the connection 12 in the lateral direction 22 and the insert 62 will compress inside of the void created by the ears of the bottom portion 38 and the inner surface 32. The extra material of the insert 62 outboard as shown in FIG. 13 will thus be forced into this void to completely fill this void as shown in FIG. 16. In other embodiments, the material of the insert 62 does not completely fill this space. Tightening may be limited by the presence of the harder component 64 that causes a hard stop once it reaches and engages the inner surface 32 such that it can no longer be tightened.

During flexing of the apparatus 10, the bending member 14 may move relative to the fastener 54 such that the fastener 54 moves up or down in the vertical direction 26 causing the voids 66 shown in FIG. 16 to become distorted and either grater or smaller in size. The deflection within the connection 12 can be to such a degree that one of the voids 66 shown in FIG. 16 is completely closed and eliminated. The connection 12 thus absorbs stress introduced into the apparatus 10 through unequal bending of the bending member 14 and skirt 18 upon deflection. This stress is absorbed by movement of the fastener 54 relative to the bending member 14, and compression of the material of the insert 62 by force of the fastener 54 through the harder component 64 into this softer insert 62 material.

Figure 18:
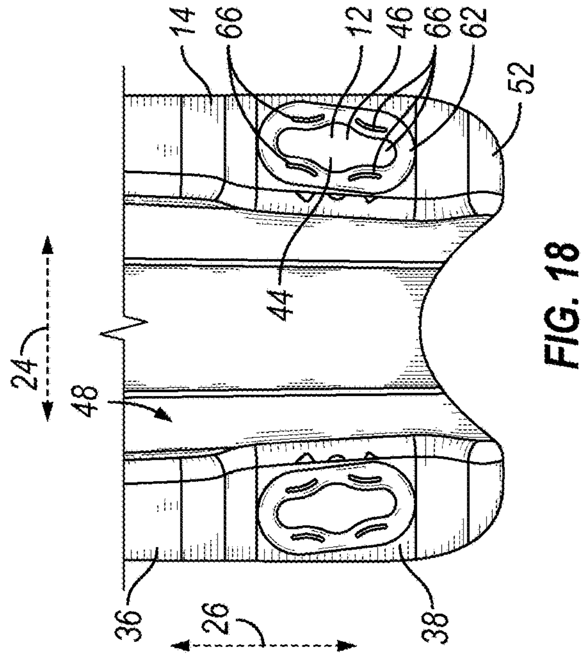
FIG. 18 is a left side view of the bottom portion of the bending member of FIG. 17.
Figure 19:
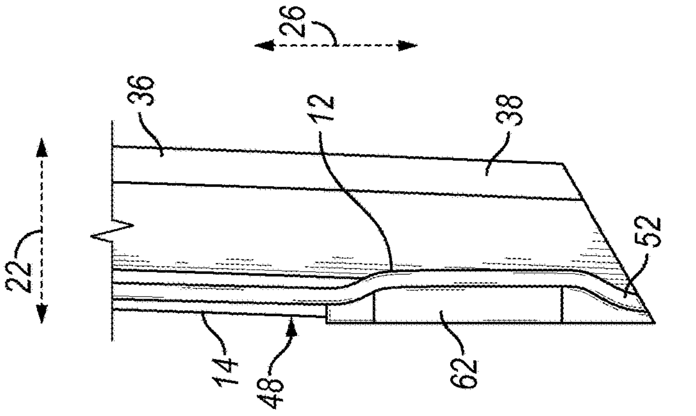
FIG. 19 is a front view of the bottom portion of the bending member of FIG. 17.
Figure 17:
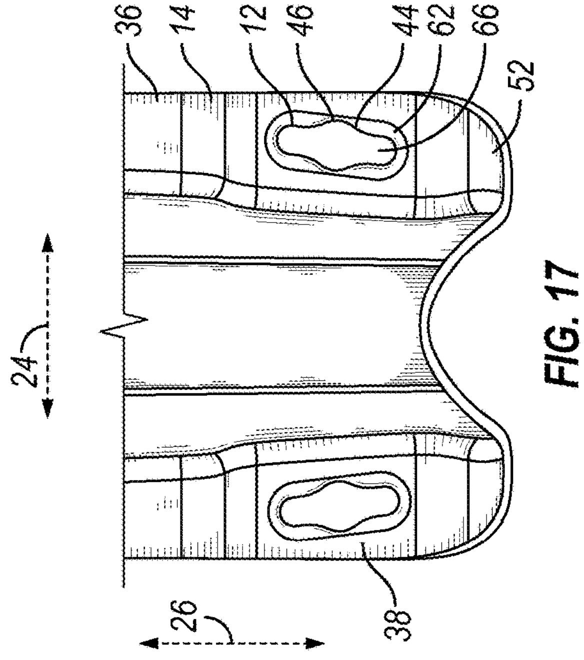
FIG. 17 is a right side view of a bottom portion of a bending member in accordance with another exemplary embodiment that has an insert.

Another version of the bending member 14 and associated connection 12 is shown with reference to FIGS. 17-19. The connection 12 is again angled in the vertical direction 26 as previously discussed and a repeat of this information is not necessary. The slot 44 again includes a detent 46 that receives the fastener 54 when in the normal, at rest position. An insert 62 is present in the slot 44 and fills some, but not all of the slot 44 as sown in FIG. 17 such that the majority of the slot 44 is not filled by the insert 62. The insert 62 does not include the harder component 64. The insert 62 does not have the same length in the longitudinal direction 24 along all points in the lateral direction 22. FIG. 18 shows four voids 66 not visible in FIG. 17 that are gaps in the material of the insert 62 that can close up during bending events to accommodate compression and movement of the material of the insert 62. The connection 12 in this embodiment is thus a combination of sliding of the fastener 54 along the slot 44 and compression along the perimeter of the slot 44 to absorb the stress of relative movement between the bending member 14 and skirt 18. The insert 62 can be compressed and accommodate relative movement of the fastener 54 in the various directions 22, 24, 26. The material of the insert 62 can be a resilient or compliant material that functions to reduce friction between the fastener 54 and bending member 14 thereby improving the life of the joint.

Figure 20:
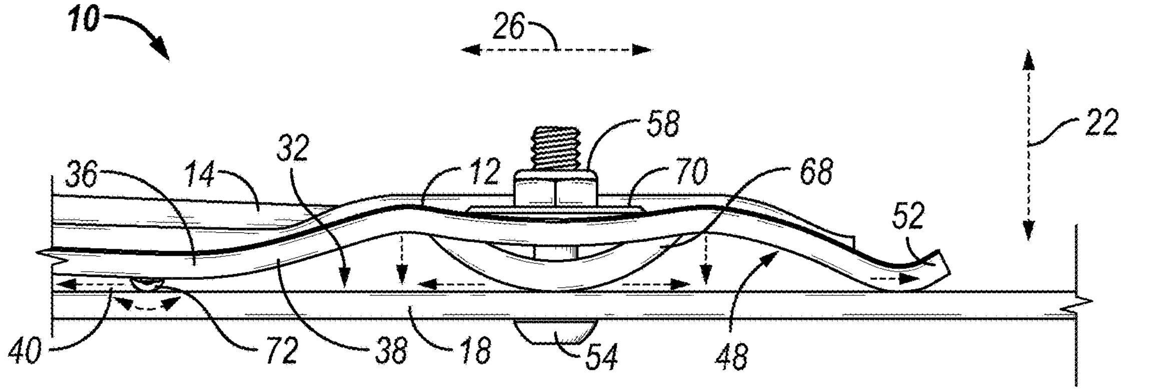
FIG. 20 is a front view of an apparatus that has a spring slot detent slider connection between the skirt and bending member.

FIGS. 20-24 illustrate another embodiment of the connection 12 that has a more complex configuration than those previously described. Here, the bottom portion 38 extends from the middle portion 36 at the location where the bending member 14 extends away from the skirt 18 and moves inboard in the lateral direction 22. The connection 12 includes a pair of ears that are again offset from the outboard side 48 of the bending member 14 in the middle portion 36. These ears both terminate into a toe 52 at the bottom terminal end. Both ears are arranged in the same manner. Each ear has an arc member 68 that extends outboard in the lateral direction 22 and engages the inner surface 32. The portion of the arc member 68 that engages the inner surface 32 is a convex portion of the arc member 68. The slot 44 extends through the center of the arc member 68 such that the slot 44 is arc shaped as well within the arc member 68. A sliding projection 72 extends from the outboard side 48 and engages the inner surface 32. The sliding projection 72 may be made of the same material as the rest of the bending member 14 from which it extends, or the sliding projection 72 can be made of a different material. The sliding projection 72 is located in the middle portion 36, but could also be moved down further to be present within the bottom portion 38. As shown in FIG. 20, the sliding projection 72, arc member 68, and toe 52 contact the inner surface 32 with the portions of the bending member 14 between them out of engagement.

Figure 21:
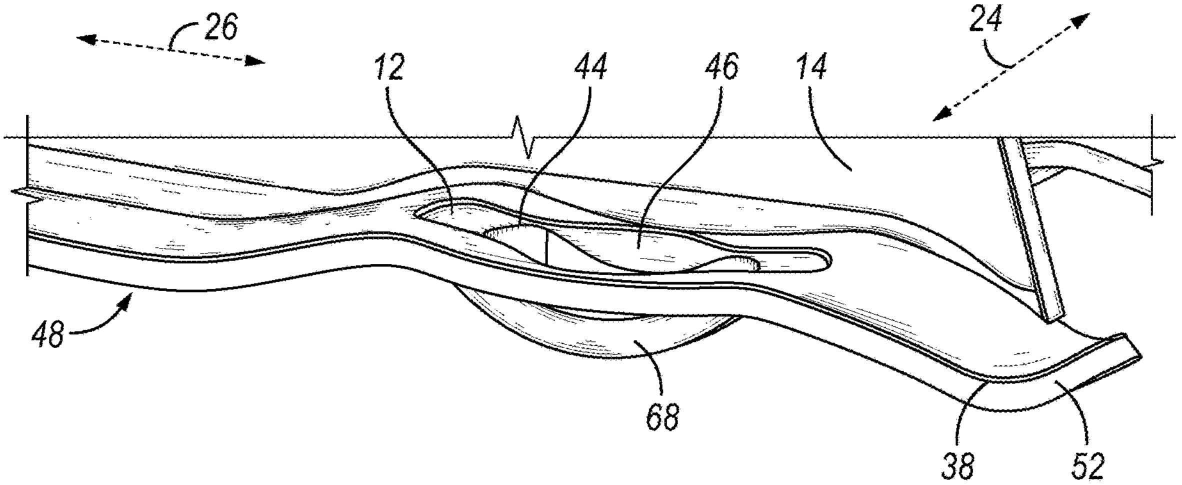
FIG. 21 is a perspective view of a bottom of the bending member of FIG. 20.
Figure 23:
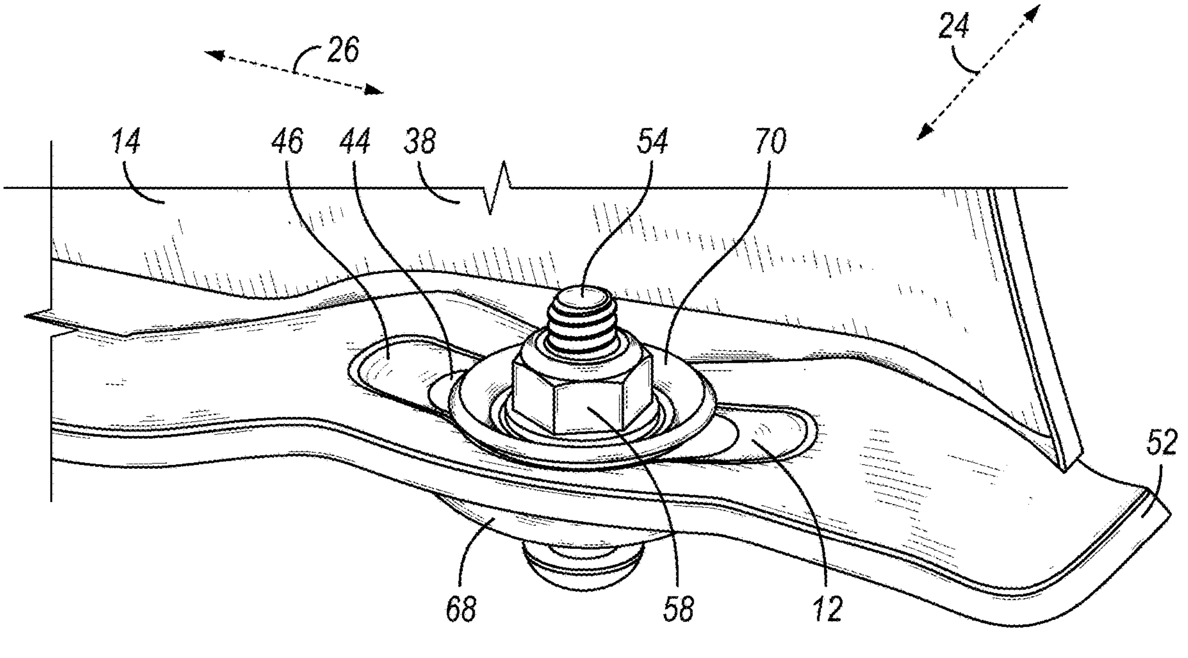
FIG. 23 is a perspective view of a bottom of the bending member of FIG. 20 that shows a fastener in the bending member.

FIG. 21 shows the shape of the slot 44 having an arc shape, and extending completely in the vertical direction 26. A detent 46 is also part of the arc shaped slot 44, but the detent 46 is not a through opening that extends from one side of the bending member to the other outboard side 48. Instead, the detent 46 opens up the slot 44 near the center to create a greater void in this region. Further on the top and bottom ends of the slot 44, detents are also present that are likewise not through apertures but function to increase the size of the slot 44 at these ends. FIG. 23 shows a concave washer 70 incorporated into the connection 12 in which its convex side engages and is disposed within the detent 46. The concave washer 70 could have a portion disposed within the slot 44, but for the most part is positioned on the arc shaped surface features that form the side of the bending member 14 in this area. The nut 54 is also visible in FIG. 23 and functions to tighten the connection 12. The nut 54 may directly engage the concave part of the concave washer 70. The fastener 54 extends through the arc members 68, the concave washer 70, and the nut 54.

Figure 22:
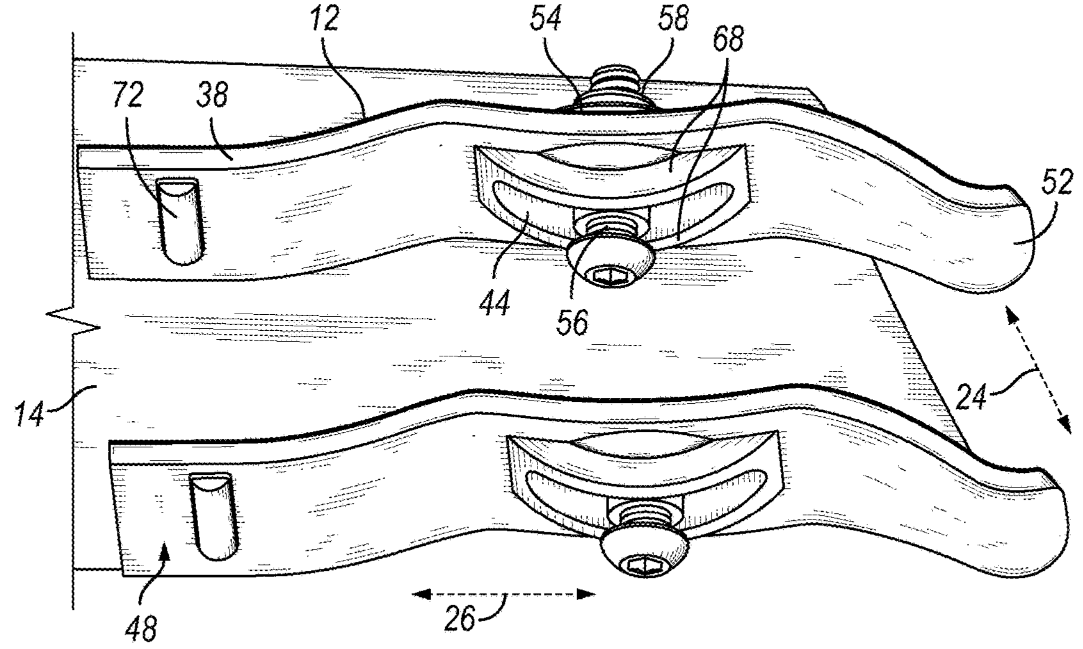
FIG. 22 is a perspective view of a bottom of the bending member of FIG. 20 that shows fasteners in the bending member.
Figure 24:
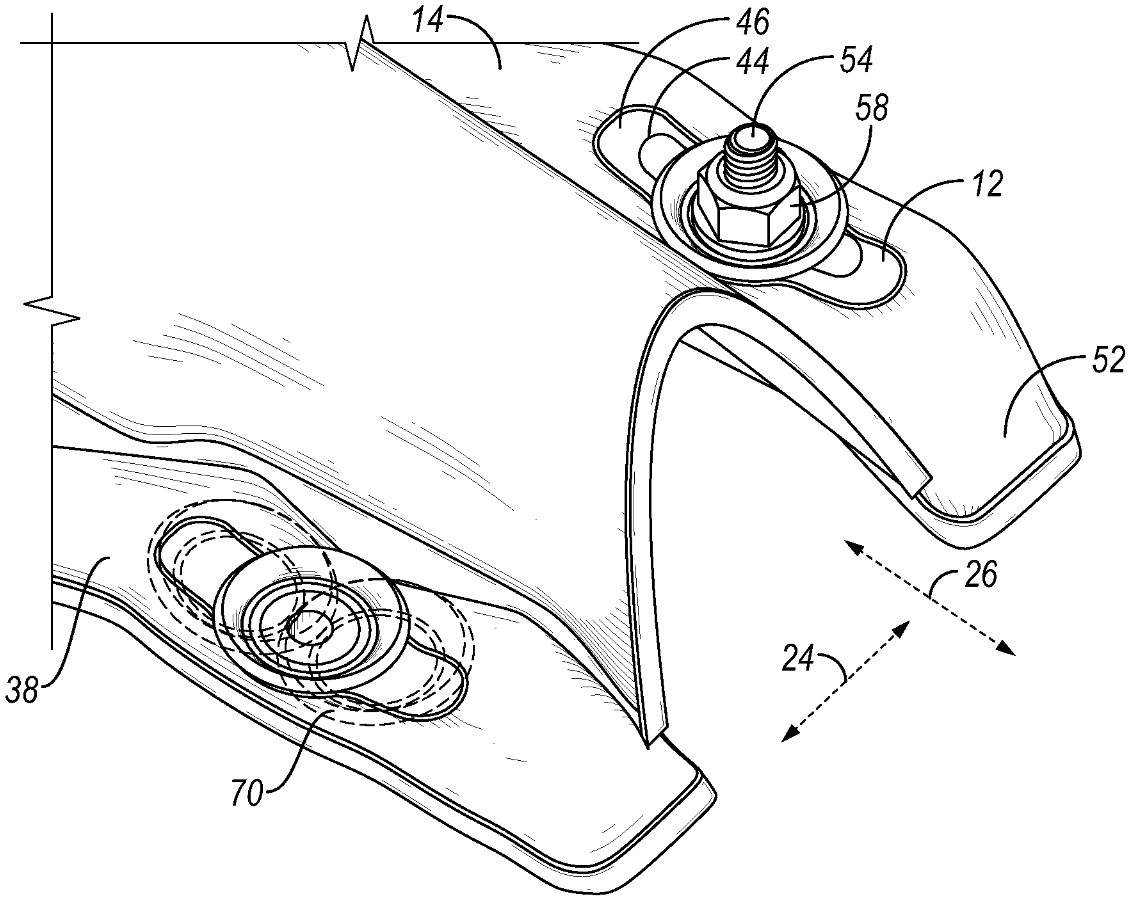
FIG. 24 is a perspective view of a bottom of the bending member of FIG. 20 that shows different positions the concave washer may be moved into.

FIG. 22 shows the pair of ears of the bottom portion 38 being configured in an identical manner. The fastener 54 need not directly engage the arc members 68. Instead, a bushing 56 can be located on the fastener 54 in this area to in turn engage the arc members 68. The bushing 56 may be made of a material that allows for easier sliding and less damage along the arc members 68 than would be the case if a metal fastener 54 were instead rubbing against the plastic or softer material of the arc members 68. FIG. 24 is a perspective view that shows where the fastener 54, nut 58, and concave washer 70 could be positioned within the slot 44. In this regard, the ear on the forward side shows these components 70, 54, 58 in the normally at rest position. On the ear on the rearward side, three concave washers 70 are shown in different positions along the slot 44 to illustrate the different relative positions these components 70, 54, 58 could be put at along the bending member 14. It is to be understood that the illustration of these three concave washers 70 is for understanding the sliding of the concave washer 70 within the slot 44 and is not meant to be a representation of what the bending member 14 would look like in reality at a static moment in time.

With reference again to FIG. 20, the connection 12 is shown in the normal, at rest position. Under a high enough event load or impact, the concave washer 70 will escape its positive detent 46 position and move up or down in the slot 44 via the detent race track shape on the outer surface. For the concave washer 70 to move beyond the neutral detent position, the concave washer 70 will compress the ear of the bottom portion 38 forcing a rolling, sliding and flattening distortion of the ear of the bottom portion 38. The leaf spring shape of the ear of the bottom portion 38, soft shaped toe 52, detent track architecture, and arc members 68 function to combine to create a tunable and decelerating or controlled bending member 14 relief. This combination of shapes along with the concave washer 70 preserve the slot 44 shape and connection 12 performance over the life of the apparatus 10.

Figure 25:
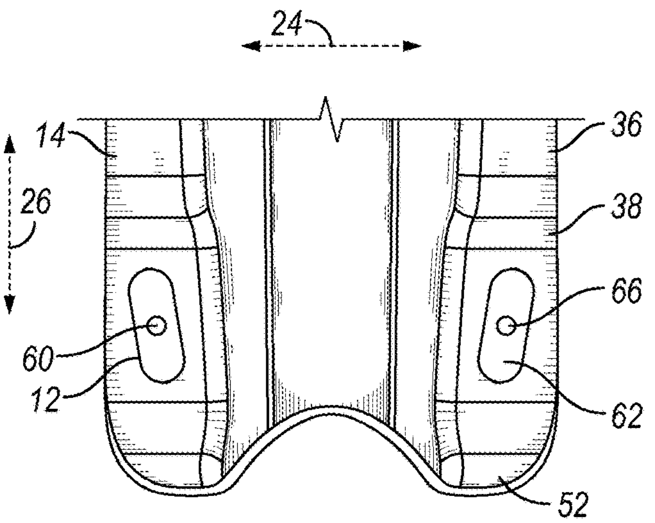
FIG. 25 is a right side view of a bottom portion of a bending member in accordance with another exemplary embodiment that includes an insert.
Figure 26:
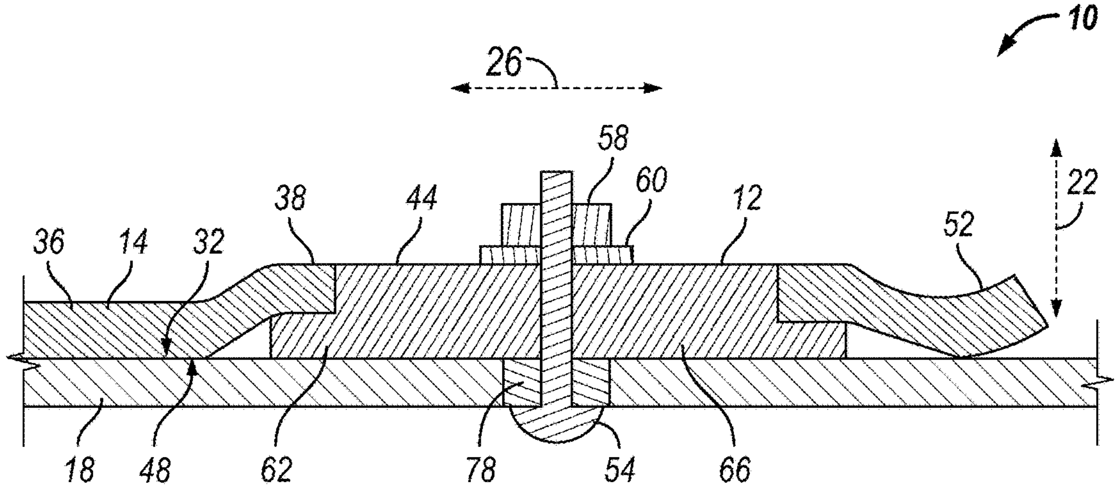
FIG. 26 is a cross-sectional view of an apparatus that includes the bending member of FIG. 25 with the fastener in a non-deflected orientation.
Figure 27:
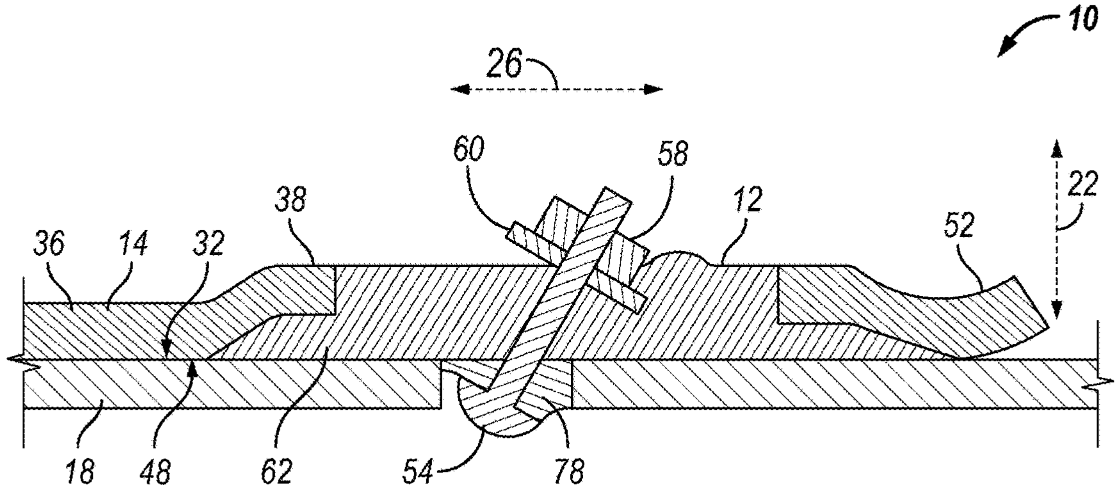
FIG. 27 is a cross-sectional view of an apparatus that includes the bending member of FIG. 25 with the fastener in a deflected orientation.

FIGS. 25-27 show another exemplary embodiment of the apparatus 10 in which the stress of relative movement between the skirt 18 and bending member 14 during skirt 18 deflection is not absorbed by a connection 12 that features sliding. Instead, the connection 12 is arranged so that only pivoting of the fastener 54 is present to absorb this stress. The bending member 14 includes an insert 62 on the bottom portion 34 that has a single through void 66. The insert 62 extends at an angle to the vertical direction 26 and is made of a material that is more compliant than the material making up the bending member 14 into which it is disposed. The material of the insert 62 may have a different modulus of elasticity than the material making up the majority of the bending member 14, and may be rubber in some arrangements with the majority of the bending member 14 being plastic.

The nut 58 engages fastener 54 to cause the connection 12 to attach the bending member 14 to the skirt 18. The insert 62 is pushed into the void of the ear but does not completely fill this void in the neutral position. The skirt 18 includes a skirt insert 78 through which the fastener 54 extends. The skirt insert 78 is a compliant member that is softer than the skirt 18 and is more compressible than the skirt 18 when force is applied to these members. The connection 12 is designed so that the fastener 54 does not slide relative to the bending member 14, but is allowed to pivot relative to the bending member 14. FIG. 27 shows the connection 12 of FIG. 26 but with force applied to the connection 12 via deflection of the skirt 18. When the skirt 18 and the bending member 14 do not deflect the same amount, stress in the connection 12 can be absorbed by the fastener 54 pivoting relative to the insert 62 and relative to the skirt 18. The washer 60 and nut 58 may in turn pivot and bite into the material of the insert 62 and cause its deformation. In a similar manner, the fastener 54 pivots against the skirt insert 78 and deforms the skirt insert 78 from that of its FIG. 26 normally at rest position. The connection 12 is thus not a rigid connection and provides some play at the fastening of the bending member 14 to the skirt 18 in this area.

Figure 28:
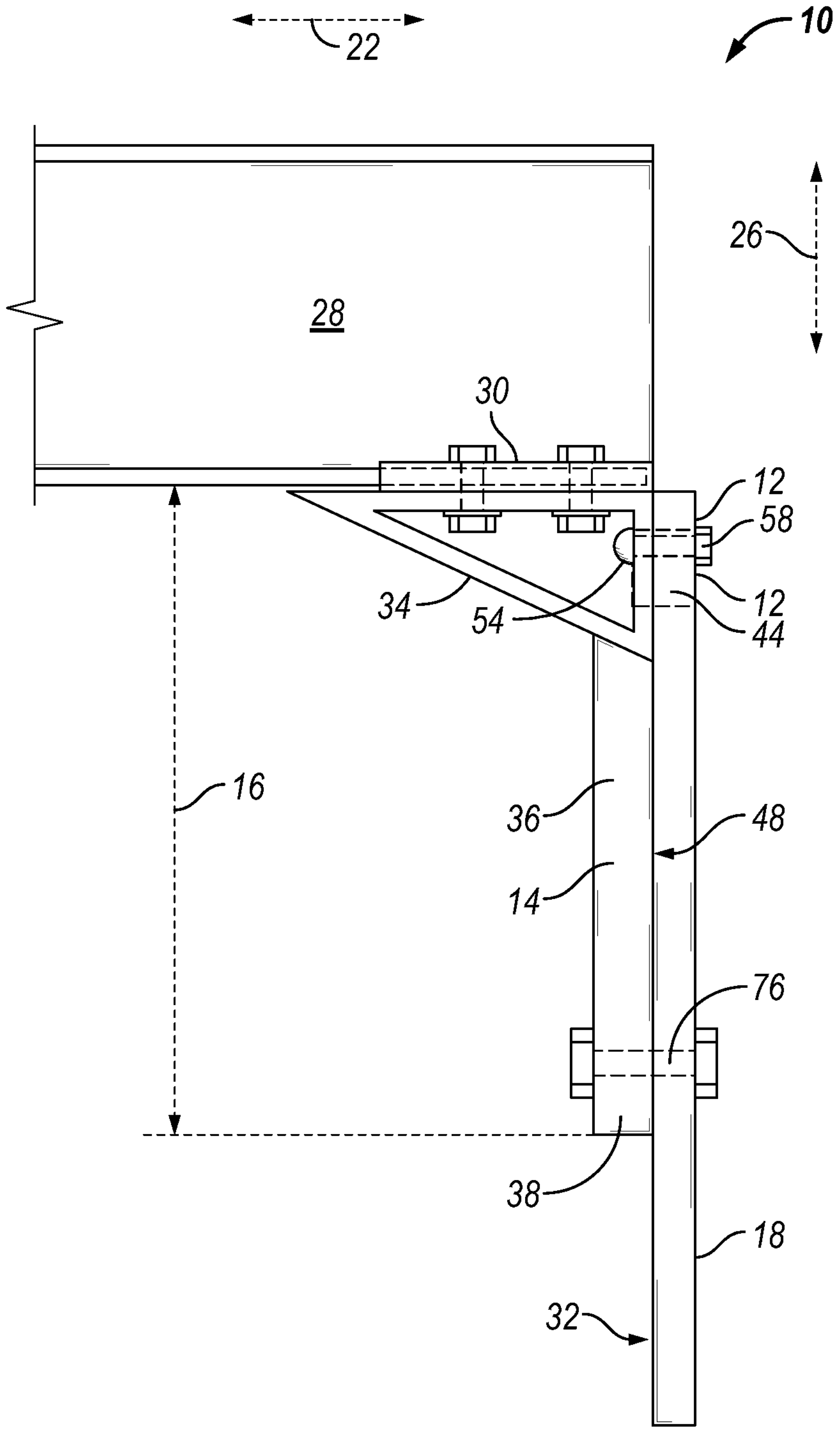
FIG. 28 is a front view of an apparatus in a non-deflected orientation that has a connection at the top of the bending member and skirt.
Figure 29:
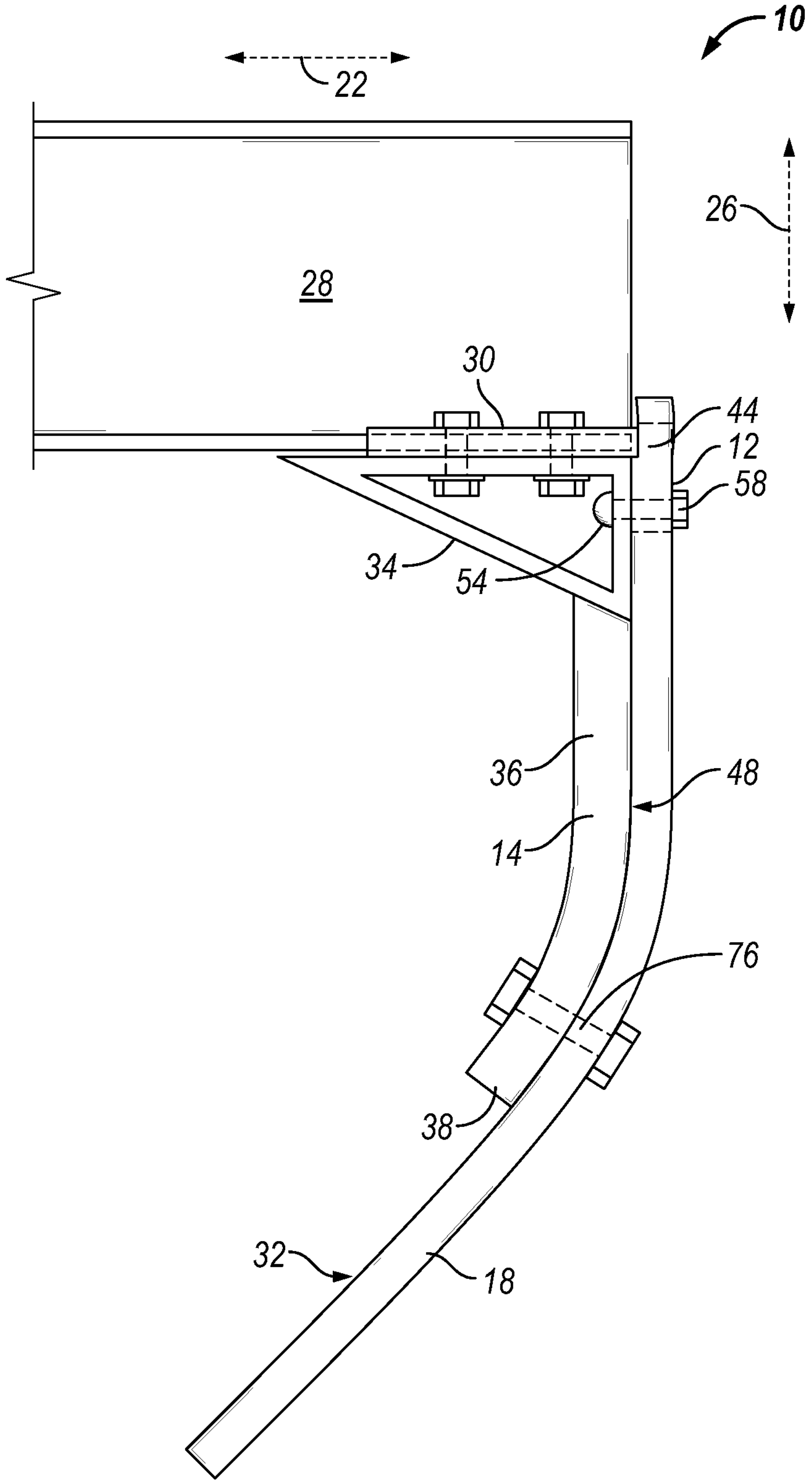
FIG. 29 is a front view of the apparatus of FIG. 28 with the bending member and skirt in a deflected orientation.

The apparatus 10 is shown reconfigured in another embodiment with reference to FIGS. 28 and 29. The connection 12 can be moved from the bottom of the bending member 14 to the top of the bending member 14 in the vertical direction 26. The bottom of the bending member 14 is rigidly attached to the skirt 18 by way of one or more bolts 76. These bolts 76 are not designed for relative movement between the skirt 18 and bending member 14 at this location. The connection 12 is located at the top of the bending member 14 in the vertical direction 26 and features a sliding engagement connection to accommodate relative movement during deflection. As a further distinction from other embodiments disclosed herein, the fastener 54 is rigidly attached to the bending member 14 and not to the skirt 18. The skirt 18 includes the slot 44, and the fastener 54 of the bending member 14 moves along the slot 44 of the skirt 18 to accommodate relative motion between the bending member 14 and skirt 18. The fastener 54 is shown as having a neutral position at one end of the slot 44, but this is only one possibility. In other configurations, the neutral position is at the middle of the slot 44 so that the connection 12 could handle deflection in either direction of the trailer skirt 18.

FIG. 29 shows deflection of the skirt 18 and bending member 14 during an impact event. The connection at bolt 76 is rigid and the relative position here will not change. However, the connection 12 is a sliding connection and if the skirt 18 bends, stretches, or compresses differently than the bending member 14, relative movement between these two components 14, 18 could be accommodated in the assembly by the sliding connection 12. The fastener 54 may move to the opposite end of the slot 44, and the skirt 18 in this area may move upward in the vertical direction 26. This structure cushions the force of impact between the connection of these elements 18, 44.

Figure 30:
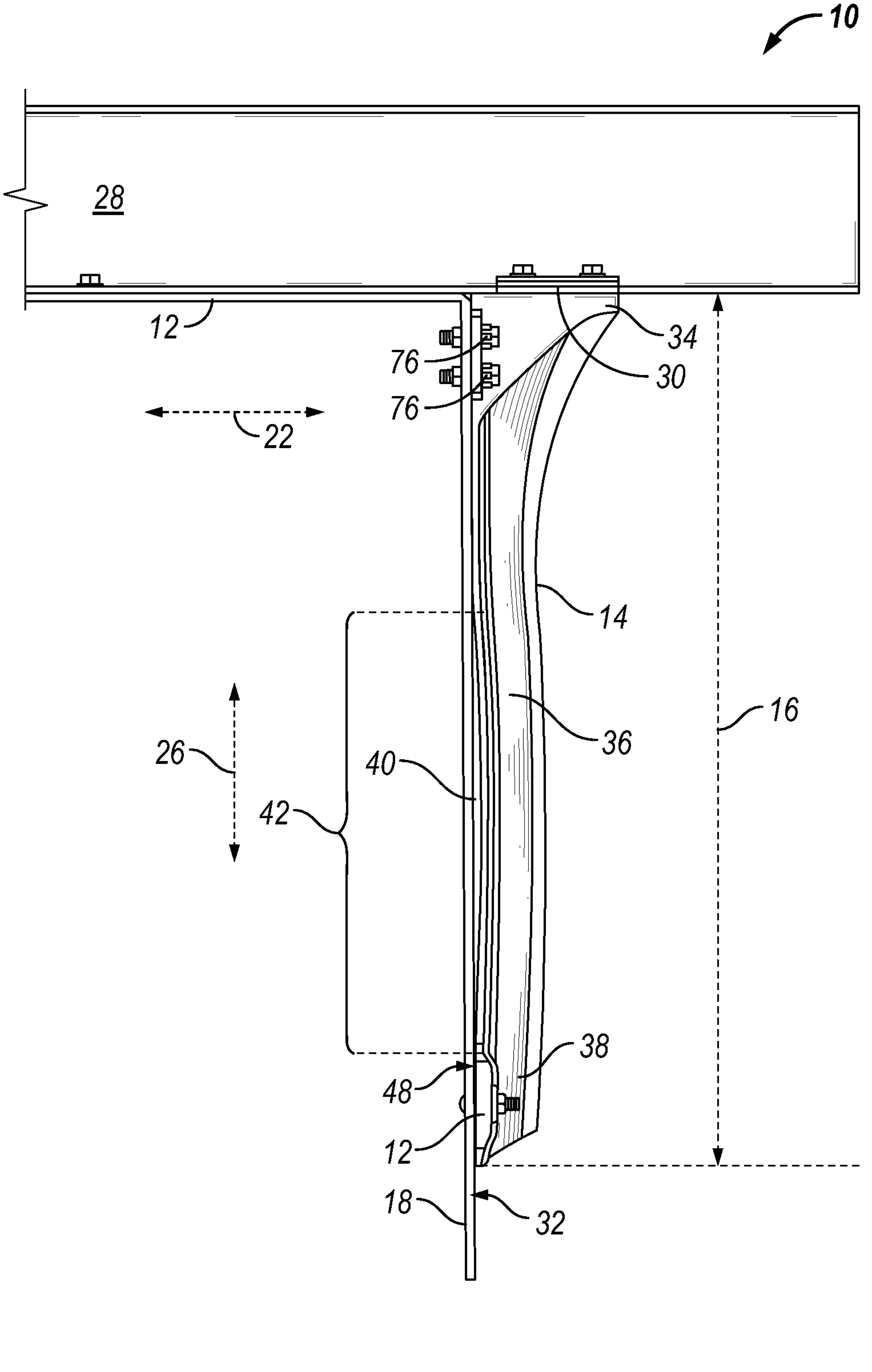
FIG. 30 is a front view of an apparatus attached to an I-beam of the trailer that features a bending member with a non-parallel section to an inner surface of the skirt.

FIG. 30 discloses another embodiment of the apparatus 10 as attached to a rib 28 that is an I-beam 28 of the trailer 20. A curved profile of the bending member 14 in some embodiments makes it unique to other products in the market that offer the same function. The bending member 14 is thus arranged so that it is not parallel to the inner surface 32, thereby making the bending member 14 neither a vertical, substantially parallel bending member nor a strut. The bending member 14 can be made stiff enough to support the skirt 18 during vehicle operating conditions for wind loads, but providing support against the tendency of the skirt 18 to flutter at certain vehicle speeds.

The bending member 14 is non-parallel to the inner surface 32, and this non-parallel feature can be expressed in terms of the vertical length 16 of the bending member 14. The vertical length 16 is the length of the bending member 14 in the vertical direction 26 during the normal, at rest position with no deflection of skirt 18. The bending member 14 is non-parallel in that at least 30% of the vertical length 16 does not have any surface area that is parallel to the inner surface 32. Some of the vertical length 16 may have some surface area that is parallel to the inner surface 32, but at least 30% of the vertical length 16 is oriented at a non-parallel position to the inner surface 32. In other embodiments, at least 50% of the vertical length 16 does not have any surface area that is parallel to the inner surface 32. In other embodiments, at least 90%, at least 80%, at least 70%, at least 60%, or at least 40% of the vertical length 16 is oriented at a non-parallel position to the inner surface 32 such that it has no surface that is parallel to the inner surface 32. These various percentages can be calculated as a percentage of the total vertical length 16, and the length of the bending member 14 having no parallel surfaces to the inner surface 32 can be a continuous length that makes up the percentage, or can be two or more sections of length that when added together make up the percentage.

The bending member 14 is attached to the skirt 18 and a space 40 is defined between the inner surface 32 and the bending member 14, specifically at a non-parallel section 42 of the bending member 14. The outboard side 48 faces the inner surface 32 and has no portion that is parallel to the inner surface 32, at least in the non-parallel section 42. The non-parallel section 42 is a length of the bending member 14 that does not have any surface area that is parallel to the inner surface 32. The length of the non-parallel section 42 can be any one of the percentages of the vertical length 16 as previously discussed. Although a single non-parallel section 42 is shown, other sections of the bending member 14 may likewise have no surfaces that are parallel to inner surface 32. The bending member 14 is arranged so that it has a single curved section 42, and flat/parallel portions in the top portion 34 and the bottom portion 38.

An attachment device 30 engages both the top portion 34 and the bottom flange of the rib 28. Bolts can be inserted through the apertures of the top portion 34 and through the attachment device 30 to fix the attachment device 30 to the top portion 34. Tightening of the bolts causes the attachment device 30 to clamp down onto the bottom flange of the rib 28 to cause the bending member 14 to be secured to the rib 28. The bolts that tighten the attachment device 30 may or may not engage the rib 28. The disclosed attachment arrangement is only exemplary, and other various types of attachment of the bending member 14 to the rib 28 or other part of the trailer 20 can be used in other embodiments.

The top portion 34 is also shown attached to the skirt 18 via the bolts 76, and the top portion 34 in this area engages the inner surface 32. The bolts that tighten the attachment device 30 do not engage the rib 28. The bottom portion 38 has some planar surfaces that are parallel to the inner surface 32. The portion of the bottom portion 38 that defines the slots 44 into which the fasteners 54 or members in the skirt 18 may ride have planar portions that are parallel to the inner surface 32. These planar portions are on both sides of the bottom portion 38 in the lateral direction 22, both those directly facing the inner surface 32 and those facing directly away from the inner surface 32. In other embodiments, the portions of the bottom portion 38 that define the slots 44 can be curved in their entirety such that no portion of the bottom portion 38 has a surface that is parallel to the inner surface 32.

Although the bottom portion 38 is shown as having some surfaces that are parallel to the inner surface 32, in other embodiments the bending member 14 can be arranged so that no portion of the bottom portion 38 has a surface parallel to the inner surface 32. In addition, no surface area of the middle portion 36 may be parallel to the inner surface 32 in some embodiments, and in these instances the only section of the bending member 14 that has any surface parallel to the inner surface 32 is in the top portion 34.

Any number of bolts 76 can be present to fix the bending member 14 to the skirt 18. Further, although the connection between the bending member 14 at the bottom portion 38 and the skirt 18 is shown as a sliding connection, it need not be sliding in other embodiments as discussed.

The connection 12 addresses wear during low amplitude, high frequency events that could otherwise be a cause for concern outside of bending operations of the skirt 18. The connection 12 can be designed so that a bracket for receiving the bending member 14 is not present on the inner surface 32. The connection 12 may thus be built into the bending member 14, and the fastener 54 could be considered a part of the bending member 14, and not the skirt 18 as it may not be rigidly attached to the skirt 18. In this manner, the skirt 18 would have no components of its own in the apparatus 10, and the connection 12 would be provided entirely by the bending member 14. The connection 12 may include the insert 62 and can be a compression joint, may include the insert 62 and may be a sliding joint, or may instead be a detented and spring loaded slip/sliding joint. The connection 12 may likewise be a vertical slot, or could be an inward or outward angled slot. The shapes of the slots 44 illustrated are only exemplary, and other slot 44 shapes are possible in other arrangements.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

We claim:

1. An apparatus, comprising:

a skirt that has an inner surface;

a bending member that engages the skirt and is located inboard from the skirt in a lateral direction, wherein the bending member has a vertical length that extends in a vertical direction, and wherein the bending member includes a curved portion that extends along the vertical direction and is configured to enable the bending member to deflect in the lateral direction from an at rest position upon application of a force on the bending member, and to return to the at rest position upon removal of the force from the bending member; and a connection between the skirt and the bending member that is a sliding connection, wherein the connection has a slot and a fastener that is disposed through the slot, wherein relative movement between the skirt and the bending member, in connection with the application of the force, causes the fastener to slide along the slot.

2. The apparatus as set forth in claim 1, wherein the slot is located in the bending member and is spaced from and does not extend to a bottom terminal end of the bending member in the vertical direction, and wherein the slot is spaced from and does not extend to a top terminal end of the bending member in the vertical direction; and wherein the slot is spaced from and does not extend to a front terminal end of the bending member in a longitudinal direction, and wherein the slot is spaced from and does not extend to a back terminal end of the bending member in the longitudinal direction.

3. The apparatus as set forth in claim 1, wherein the slot is located in the bending member, and wherein the bending member has a plurality of strength members that surround the slot to reinforce the bending member.

4. The apparatus as set forth in claim 1, wherein the bending member has two ears on opposite sides of the bending member in a longitudinal direction, wherein the curved portion is located between the two ears, wherein the ears terminate in a toe at a bottom terminal end of the bending member in the vertical direction, wherein the ears extend in the lateral direction away from the inner surface such that at least a portion of the ears are out of engagement with the inner surface; and wherein the slot is located within one of the ears, and wherein the fastener is rigidly attached to the skirt.

5. The apparatus as set forth in claim 1, wherein the slot extends in the vertical direction and has a detent located at a midpoint of the slot in the vertical direction.

6. The apparatus as set forth in claim 1, wherein the bending member has a longitudinal center in a longitudinal direction, wherein the slot extends in the vertical direction and in the longitudinal direction, and wherein the slot has a slot bottom and a slot top such that the slot top is located higher than the slot bottom in the vertical direction; and wherein the longitudinal center is closer to the slot bottom than the longitudinal center is to the slot top.

7. The apparatus as set forth in claim 1, wherein the connection has a bushing, a nut, and a washer; and wherein the fastener extends through the skirt, the bushing, and the washer, wherein the bushing engages the skirt, wherein the washer engages the bending member, and wherein the nut engages the washer and is free from engagement with the bending member.

8. The apparatus as set forth in claim 1, wherein the connection has a harder component through which the fastener extends such that the fastener engages the harder component, wherein the fastener is rigidly attached to the skirt;

wherein the connection has an insert that is carried by the bending member, wherein a material making up the harder component is harder than a material making up the insert, and wherein the harder component engages the insert; and wherein the insert has a plurality of voids therethrough, and wherein the fastener is free from engagement with the insert.

9. The apparatus as set forth in claim 1, wherein the bending member has an arc member that has a convex portion that engages the inner surface, wherein the slot extends through the arc member.

10. The apparatus as set forth in claim 9, wherein the slot has a detent, and wherein the connection has a concave washer that has a convex side that engages the bending member, wherein the connection has a nut that engages the concave washer;

wherein the fastener extends through the concave washer and the nut is attached to the fastener; and wherein the relative movement between the skirt and the bending member causes the concave washer to slide along the slot.

11. The apparatus as set forth in claim 9, wherein the bending member has a sliding projection that is located higher than the arc member in the vertical direction, wherein the sliding projection engages the inner surface; and wherein the bending member has a toe that is located lower than the arc member in the vertical direction, wherein the toe engages the inner surface.

12. The apparatus as set forth in claim 1, wherein the bending member has a bottom terminal end in the vertical direction, wherein the bending member has a top terminal end in the vertical direction, and wherein the connection is located closer to the bottom terminal end than to the top terminal end in the vertical direction.

13. The apparatus as set forth in claim 1, wherein the bending member has a bottom terminal end in the vertical direction, wherein the bending member has a top terminal end in the vertical direction, and wherein the connection is located closer to the top terminal end than to the bottom terminal end in the vertical direction.

14. The apparatus as set forth in claim 1, wherein the bending member is made of plastic.

15. The apparatus as set forth in claim 1, wherein the relative movement between the skirt and the bending member causes the fastener to pivot relative to the slot.

16. An apparatus, comprising:

a bending member that includes:

a slot, and a convex portion that is configured to enable the bending member to deflect from an at rest position upon application of a force on the bending member, and to return to the at rest position upon removal of the force from the bending member; and a fastener disposed through the slot and configured to attach the bending member to a skirt, wherein the fastener is configured to slide along the slot during relative movement between the bending member and the skirt in connection with the application of the force.

17. The apparatus as set forth in claim 16, wherein the bending member further includes an ear that includes the slot, and wherein, when the bending member is attached to the skirt and is in the at rest position, the ear extends away from the skirt such that at least a portion of the ear is out of engagement with the skirt when the bending member is in the at rest position.

18. The apparatus as set forth in claim 17, wherein the ear is a first ear, and wherein the bending member further includes:

a second ear, wherein the convex portion extends between the first ear and the second ear.

19. An apparatus, comprising:

a bending member including:

an ear having a slot that is configured to receive a fastener for slidable attachment to a skirt, and a center curved portion that is configured to enable the bending member to deflect from an at rest position upon application of a force on the bending member, and to return to the at rest position upon removal of the force from the bending member, wherein, when the bending member is attached to the skirt and in the at rest position, the ear is configured to extend away from an inner surface of the skirt such that at least a portion of the ear is out of engagement with the skirt when the bending member is in the at rest position.

20. The apparatus as set forth in claim 19, wherein the bending member further includes a top portion, a middle portion, and a bottom portion, wherein the top portion is configured to be attached to an I-beam and to the skirt, wherein the middle portion and the bottom portion include the center curved portion, and wherein the bottom portion further includes the ear.

* * * * *